United States Patent
Nakai et al.

(10) Patent No.: US 12,025,909 B2
(45) Date of Patent: Jul. 2, 2024

(54) PHOTORESPONSIVE COMPOUND

(71) Applicant: Konica Minolta, Inc., Tokyo (JP)

(72) Inventors: Yukiko Nakai, Toyohashi (JP); Toyoko Shibata, Tokyo (JP); Kazuaki Nakamura, Hino (JP); Kouji Sugama, Musashino (JP)

(73) Assignee: KONICA MINOLTA, INC., Tokyo (JP)

( * ) Notice: Subject to any disclaimer, the term of this patent is extended or adjusted under 35 U.S.C. 154(b) by 56 days.

(21) Appl. No.: 17/664,179

(22) Filed: May 19, 2022

(65) Prior Publication Data

US 2022/0390824 A1    Dec. 8, 2022

(30) Foreign Application Priority Data

May 24, 2021    (JP) .................................. 2021-087106

(51) Int. Cl.
  *G03C 1/73* (2006.01)
  *C08F 220/18* (2006.01)
  *G03G 9/08* (2006.01)

(52) U.S. Cl.
  CPC ........ *G03C 1/733* (2013.01); *C08F 220/1806* (2020.02); *G03G 9/08* (2013.01)

(58) Field of Classification Search
  None
  See application file for complete search history.

(56) References Cited

U.S. PATENT DOCUMENTS 6,348,293 B1 * 2/2002 Verbeeck ................. G03C 5/16
                                                  430/564
2013/0066068 A1    3/2013 Norikane et al.

FOREIGN PATENT DOCUMENTS

| JP | 2011-256155 A | | 12/2011 | |
|----|---------------|---|---------|---|
| JP | 2011-256291 A | | 12/2011 | |
| JP | 2020132700 A | * | 8/2020 | ............ C08F 120/38 |

OTHER PUBLICATIONS

Robert et al., Engineering Solid-State Molecular Switches: N-Salicylidene N-Heterocycle Derivatives, Eur. J. Org. Chem. 2010, 621-637.*

* cited by examiner

*Primary Examiner* — Eli D. Strah
(74) *Attorney, Agent, or Firm* — LUCAS & MERCANTI, LLP

(57) ABSTRACT

Provided is a compound which is fluidized by light irradiation and is less colored. The compound is a compound represented by the following general formula (1), which is fluidized by light irradiation:

$$R_1\text{—CH}=\text{N}\text{—}R_2 \qquad \text{General Formula (1)}$$

wherein $R_1$ is a substituted or unsubstituted cyclic hydrocarbon group or a substituted or unsubstituted heterocyclic group; and $R_2$ is a substituted or unsubstituted heterocyclic group containing a nitrogen atom bonded to the nitrogen atom in the general formula (1).

14 Claims, 2 Drawing Sheets

PHOTORESPONSIVE COMPOUND

BACKGROUND

Technological Field

The present invention relates to a photoresponsive compound which is fluidized by light irradiation.

Description of the Related Art

As a material whose fluidity is changed by light irradiation, a photoresponsive material is known. For example, an azobenzene compound (azobenzene derivative) disclosed in JP 2011-256155 A or JP 2011-256291 A undergoes a phase change in association with an isomerization reaction caused by light irradiation. It is considered that an associated change in molecular structure induces a phase transition from a solid state to a fluid state.

SUMMARY

However, the azobenzene derivatives disclosed in JP 2011-256155 A and JP 2011-256291 A are both colored yellow to orange, and have a problem that the azobenzene derivative does not enable reproduction of a desired color when applied to industrial products such as toners and adhesives. Further, according to studies made by the present inventors, it has been found that for the yellow to orange coloring, the color can be adjusted to a certain degree by changing a substituent of the azobenzene derivative, but it is impossible to attain a completely colorless or nearly colorless state.

Accordingly, an object of the present invention is to provide a compound which is fluidized by light irradiation and is less colored.

To achieve at least one of the abovementioned objects, according to an aspect of the present invention, an azomethine compound having a ring structure at each of both ends of a C=N bond, in which a nitrogen atom is directly bonded to the nitrogen atom of the C=N bond, is provided.

According to an aspect of the present invention, a compound represented by the following general formula (1), which is fluidized by light irradiation, is provided.

[Chemical Formula 1]

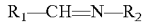  General Formula (1)

In the formula,
R$_1$ is a substituted or unsubstituted cyclic hydrocarbon group or a substituted or unsubstituted heterocyclic group; and
R$_2$ is a substituted or unsubstituted heterocyclic group containing a nitrogen atom bonded to the nitrogen atom in the general formula (1).

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
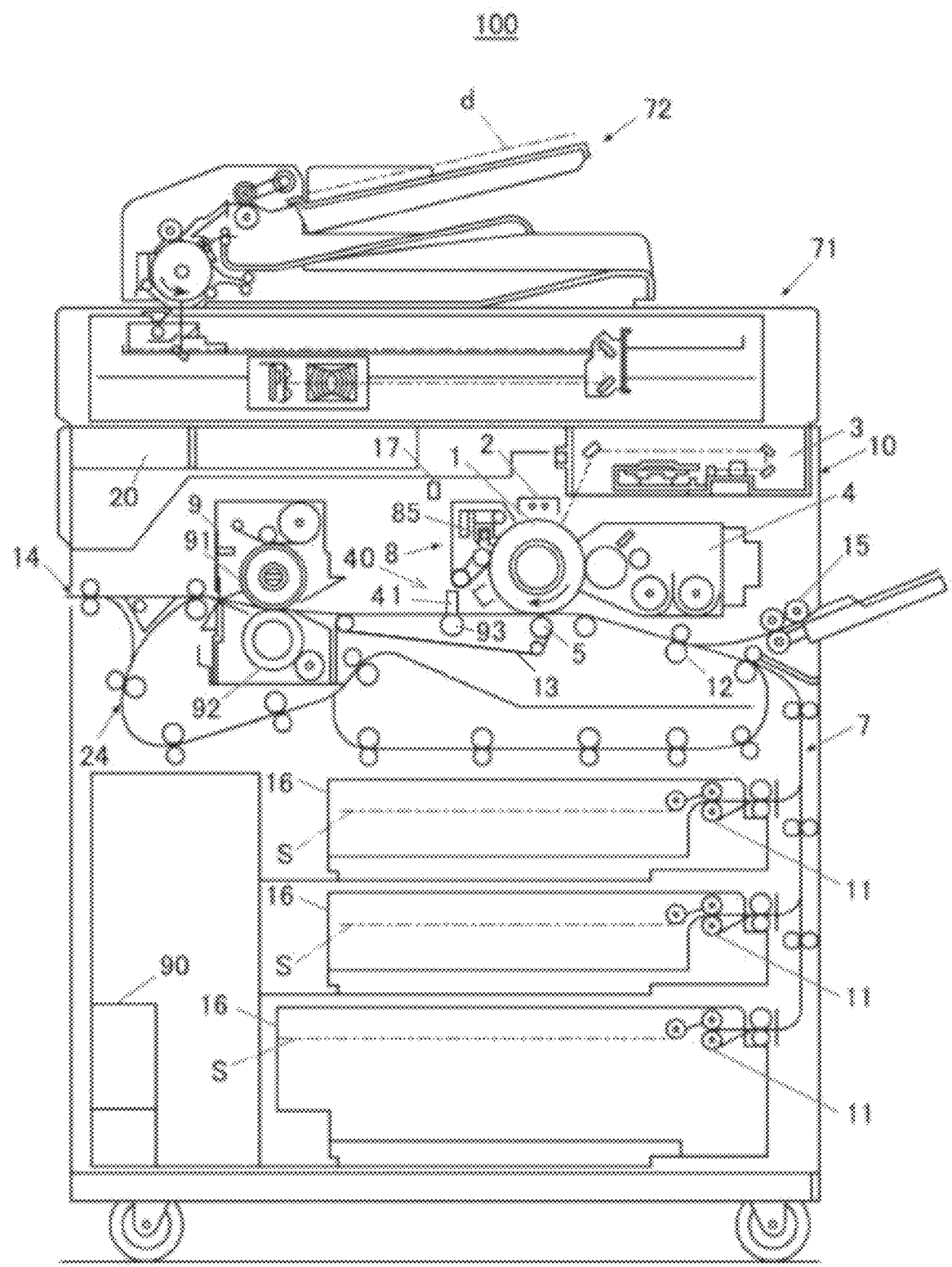
FIG. 1 is a schematic configuration diagram illustrating an image forming apparatus 100 used in an image forming method according to an embodiment of the present invention.

Hereinafter, one or more embodiments of the present invention will be described with reference to the drawings. However, the scope of the invention is not limited to the disclosed embodiments.

In the present specification, "X to Y" indicating a range means "X or more and Y or less". In addition, in the present specification, unless otherwise specified, operations and measurements of physical properties and the like are performed under conditions of room temperature (20° C. to 25° C.)/relative humidity of 40 to 50% RH.

<Photoresponsive Compound>

An embodiment of the present invention is a compound represented by the following general formula (1), which is fluidized by light irradiation.

[Chemical Formula 2]

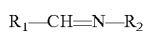  General Formula (1)

In the formula,
R$_1$ is a substituted or unsubstituted cyclic hydrocarbon group or a substituted or unsubstituted heterocyclic group; and
R$_2$ is a substituted or unsubstituted heterocyclic group containing a nitrogen atom bonded to the nitrogen atom in the general formula (1). The compound of the present embodiment is excellent in photoresponsive property of being fluidized by light irradiation, and is less colored. According to the present invention, it is possible to provide a compound that is fluidized by light irradiation and is less colored.

In the present specification, the phrase "fluidized by light irradiation" refers to being turned from a non-fluid state into a fluid state by light irradiation. That is, at normal temperature and normal pressure, the compound of the present invention is in a non-fluid solid state when the compound is not irradiated with light, and the compound is softened and turned into a fluid state when irradiated with light. In the present specification, the fluid state refers to a state in which deformation occurs with a small external force.

A mechanism of exerting such a technical effect is presumed as follows. However, the technical scope of the present invention is not limited to such a mechanism. That is, the azobenzene compound is a material that absorbs light and softens (undergoes optical phase transition) from a solid state, and it is considered that the optical phase transition is caused by disorder of a crystal structure due to cis-trans isomerization. The azobenzene compound disclosed in JP 2011-256155 A or JP 2011-256291 A undergoes a phase change in association with an isomerization reaction caused by light irradiation, however, it has been found that since these compounds exhibit strong absorption due to n-π* transition in a visible light region, and are colored in orange, the compounds have a problem in that the compounds hardly allow a desired color to be reproduced when applied to industrial products.

In the present invention, a compound that is fluidized by light irradiation and is less colored has been provided by using a predetermined azomethine compound. By introduction of an azomethine moiety (C=N part) instead of the azobenzene moiety, the strong n-π* absorption in the azobenzene compound can be weakened, so that a compound that is less colored can be realized.

In addition, in the compound that is fluidized due to photoisomerization, it is considered that when a non-fluid trans isomer is irradiated with light and isomerized to a cis isomer, many trans isomers change to cis isomers, so that an ordered structure of the compound is disordered and a phase transition change, that is, a fluidization phenomenon can be induced. Therefore, in order to induce the phenomenon that the compound is fluidized, it is considered necessary that many trans isomers be isomerized to cis isomers. However, it is known that an azomethine compound generally has a higher rate of isomerization from a cis isomer to a trans isomer over an azobenzene compound, and it is expected that an azomethine compound having unsubstituted benzene rings introduced at both ends of a C=N bond is disadvantageous for inducing a phenomenon that the compound is fluidized.

Thus, in the present invention, an azomethine compound having ring structures at both ends of a C=N bond, in which a nitrogen atom is directly bonded to the C=N bond, is provided. Consequently, fluidization associated with photoisomerization reaction can be effectively induced. This is considered to be because cis isomers are stabilized, so that a larger number of cis isomers are generated.

Hereinafter, the compound represented by the general formula (1) will be further described.

In the general formula (1), $R_1$ is a substituted or unsubstituted cyclic hydrocarbon group, or a substituted or unsubstituted heterocyclic group.

Examples of the cyclic hydrocarbon group include an aromatic hydrocarbon group and an alicyclic hydrocarbon group. An aromatic hydrocarbon group is preferred because an intermolecular ππ stack is strongly formed and a non-fluid state is secured (a melting point is secured) in the trans isomer, and significant collapse of an ordered structure is induced when a change to a cis isomer occurs.

The aromatic hydrocarbon group is not particularly limited, and is preferably an aromatic hydrocarbon group having 6 to 30 carbon atoms. In a preferred embodiment of the present invention, $R_1$ is a substituted or unsubstituted phenyl group, naphthyl group, anthracenyl group, phenanthrenyl group, pyrenyl group or biphenyl group. Such a compound is more effectively fluidized. In particular, $R_1$ is a substituted or unsubstituted phenyl group, naphthyl group or phenanthrenyl group from the viewpoint of easily developing packing between molecules, exhibiting high thermal mobility when trans-cis isomerization occurs, and easily inducing a fluidization phenomenon.

The alicyclic hydrocarbon group is not particularly limited, and is preferably a substituted or unsubstituted alicyclic hydrocarbon group having 3 to 30 carbon atoms. In a preferred embodiment of the present invention, $R_1$ is a substituted or unsubstituted cyclopropyl group, cyclobutyl group, cyclopentyl group, cyclohexyl group, cycloheptyl group, cyclooctyl group, cyclononyl group, cyclodecyl group, norbornyl group, isobornyl group, adamantyl group, cyclopentenyl group, cyclohexenyl group or cyclopentenyl group, more preferably a substituted or unsubstituted cyclohexyl group.

As the heterocyclic group constituting $R_1$, either an aromatic heterocyclic group or a non-aromatic heterocyclic group can be used. In the present embodiment, an aromatic heterocyclic group is preferred because an intermolecular ππ stack is strongly formed and a non-fluid state is secured (a melting point is secured) in the trans isomer, and significant collapse of an ordered structure is induced when a change to a cis isomer occurs.

The aromatic heterocyclic group constituting $R_1$ is not particularly limited, and is preferably an aromatic heterocyclic group having 2 to 30 carbon atoms. The aromatic heterocyclic group is preferably one having a high electron donating property. In a preferred embodiment of the present invention, $R_1$ is a substituted or unsubstituted thienyl group, furanyl group, pyrrolyl group, pyrazolyl group, imidazolyl group, pyridyl group, pyridazinyl group, pyrimidinyl group, pyrazinyl group, triazonyl group, tetrazolyl group, triazinyl group, benzothienyl group, benzimidazolyl group, indolyl group, isoindolyl group, quinolinyl group, isoquinolinyl group, quinazolinyl group, quinoxalinyl group, naphthyridinyl group, acridinyl group, carbazolyl group or dibenzothienyl group. Such a compound is more effectively fluidized.

The non-aromatic heterocyclic group constituting $R_1$ is not particularly limited, and is preferably a saturated or unsaturated non-aromatic heterocyclic group having 3 to 30 carbon atoms. In a preferred embodiment of the present invention, examples of $R_1$ include groups derived from a pyrrolidine ring, a tetrahydrofuran ring, a tetrahydrothiophene ring, a piperidine ring, a piperazine ring, a tetrahydropyran ring, a tetrahydrothiopyran ring, a dioxane ring, a morpholine ring, a dioxolane ring, and the like.

In the general formula (1), $R_2$ is a substituted or unsubstituted heterocyclic group containing a nitrogen atom bonded to the nitrogen atom in the general formula (1).

The heterocyclic group constituting $R_2$ is not particularly limited as long as it has a nitrogen atom bonded to the nitrogen atom in the general formula (1), and either an aromatic heterocyclic group or a non-aromatic heterocyclic group can be used. In the present embodiment, an aromatic heterocyclic group is preferred because an intermolecular ππ stack is strongly formed and a non-fluid state is secured (a melting point is secured) in the trans isomer, and significant collapse of an ordered structure is induced when a change to a cis isomer occurs.

The aromatic heterocyclic group constituting $R_2$ is not particularly limited, and is preferably a substituted or unsubstituted aromatic heterocyclic group having 2 to 30 carbon atoms. The aromatic heterocyclic structure is preferably one having a high electron donating property. In a preferred embodiment of the present invention, $R_2$ is a pyrrolyl group, a pyrazolyl group, an imidazolyl group, a 1,2,3-triazolyl group, a 1,2,4-triazolyl group, a tetrazolyl group, a benzimidazolyl group, an indolyl group, an isoindolyl group, an acridinyl group or a carbazolyl group, one of nitrogen atoms of which is bonded to the nitrogen atom in the general formula (1). These groups may have a substituent. Such a compound is more effectively fluidized.

The non-aromatic heterocyclic group constituting $R_2$ is not particularly limited, and is preferably a saturated or unsaturated non-aromatic heterocyclic group having 3 to 30 carbon atoms. In a preferred embodiment of the present invention, examples of $R_2$ include groups derived from a pyrrolidine ring, a piperidine ring, a piperazine ring, a pyrazolidine ring, an imidazolidine ring, a triazolidine ring, a tetrazolidine ring, a pyrroline ring or the like, one of nitrogen atoms of which is bonded to the nitrogen atom in the general formula (1), and the like.

In a preferred embodiment of the present invention, $R_1$ is a substituted or unsubstituted aromatic hydrocarbon group or a substituted or unsubstituted aromatic heterocyclic group; and $R_2$ is an aromatic heterocyclic group containing a nitrogen atom bonded to the nitrogen atom in the general formula (1). When $R_1$ and $R_2$ have aromaticity, an intermolecular ππ stack is strongly formed and a non-fluid state is secured (a melting point is secured) in the trans isomer, and significant collapse of an ordered structure is induced when a change to a cis isomer occurs. As a result, fluidization may occur more effectively.

The cyclic hydrocarbon group or heterocyclic group constituting $R_1$ and the heterocyclic group constituting $R_2$ may each have a substituent. The substituent is not particularly limited, and examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, and an alkoxycarbonyl group having 2 to 19 carbon atoms. The substituent is preferably a substituent selected from the group consisting of a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

As described above, the optical phase transition of the azomethine compound is considered to be caused by disorder of the crystal structure due to cis-trans isomerization as in the azobenzene compound. In general, since the azomethine compound has a strong π-π interaction between molecules, the optical phase transition occurs only at the outermost surface of the crystal structure. In this context, when the cyclic hydrocarbon group or the heterocyclic group each represented by $R_1$ or $R_2$ in the general formula (1) has a substituent, the azomethine compound of the present invention forms a specific crystal structure in which, in a periodic structure dominated by the π-π interaction, a structure isotropically disturbed by thermal motion of these substituents coexists. Therefore, when the cis-trans isomerization reaction locally proceeds and the π-π interaction of the azomethine moiety is reduced, isotropic melting occurs in a chain manner in the entire system. Therefore, it is considered that cis-trans isomerization is more likely to proceed, and fluidization is more likely to occur.

In particular, it is preferred that in the general formula (1), $R_1$ be a phenyl group having a substituent selected from the group consisting of an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms at a para position with respect to the carbon atom in the general formula (1). Such a structure induces generation of lattice defects, development of free volume, reduction of the π-π interaction, and the like, which act favorably for cis-trans isomerization. Therefore, it is considered that cis-trans isomerization is more likely to proceed, and fluidization is more likely to occur. In particular, introduction of these substituents at the para-position of the benzene ring facilitates collapse of crystals, improves the photo-meltability, and further enhances fixability and further improve image stability when the compound is used for a toner. Among the above-mentioned groups, an alkyl group having 1 to 18 carbon atoms, an alkoxy group having 1 to 18 carbon atoms, or a dialkylamino group having 2 to 10 carbon atoms is more preferred because of higher thermal mobility.

The number of carbon atoms in the substituent at a para position, the alkyl group is more preferably an alkyl group having 1 to 12 carbon atoms, still more preferably an alkyl group having 4 to 12 carbon atoms. The alkoxy group is more preferably an alkoxy group having 1 to 12 carbon atoms, still more preferably an alkoxy group having 4 to 12 carbon atoms. The dialkylamino group is more preferably a dialkylamino group having 2 to 8 carbon atoms, still more preferably a dialkylamino group having 4 to 6 carbon atoms. The acyl group is more preferably an acyl group having 2 to 13 carbon atoms, still more preferably an acyl group having 5 to 13 carbon atoms. In addition, the alkoxycarbonyl group is more preferably an alkoxycarbonyl group having 2 to 13 carbon atoms, still more preferably an alkoxycarbonyl group having 5 to 13 carbon atoms. Introduction of a long-chain substituent facilitates collapse of crystals, improves the photo-meltability, and further improves fixability and image stability when the compound is used for a toner. The alkyl group and the alkoxy group may be linear or branched, and are preferably linear because fluidization can be more effectively exhibited.

Examples of the alkyl group having 1 to 18 carbon atoms are not particularly limited, and include linear alkyl groups such as a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, and a n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, a n-propoxy group, a n-butoxy group, a n-pentyloxy group, a n-hexyloxy group, a n-heptyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, and a n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include a methylamino group, an ethylamino group, a n-propylamino group, a n-butylamino group, an isobutylamino group, a n-hexylamino group, a n-heptylamino group, a n-octylamino group, a n-nonylamino group, a n-decylamino group, and the like.

Examples of the dialkylamino group having 2 to 10 carbon atoms include a dimethylamino group, a diethylamino group, a di-n-propylamino group, a di-n-butylamino group, a di-isobutylamino group, a methylethylamino group, and the like.

Examples of the acyl group having 2 to 19 carbon atoms include saturated or unsaturated, linear or branched acyl groups, and examples thereof include an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, an oleoyl group, and the like.

Examples of the alkoxycarbonyl groups having 2 to 19 carbon atoms include those that are linear or branched, and examples thereof include linear alkoxycarbonyl groups such as a methoxycarbonyl group, an ethoxycarbonyl group, a n-butoxycarbonyl group, a n-hexyloxycarbonyl group, a n-heptyloxycarbonyl group, a n-octyloxycarbonyl group, a n-nonyloxycarbonyl group, a n-decyloxycarbonyl group, a n-undecyloxycarbonyl group, a n-dodecyloxycarbonyl group, a n-tridecyloxycarbonyl group, a n-tetradecyloxycarbonyl group, a n-pentadecyloxycarbonyl group, and a n-hexadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group and a 1-hexylheptyloxycarbonyl group.

In a preferred embodiment of the present invention, the $R_1$ contains a benzene ring which is, at least at one of two ortho positions with respect to the carbon atom in the general formula (1), unsubstituted or substituted with an alkyl group having 1 to 5 carbon atoms, an alkoxy group having 1 to 5 carbon atoms, or a halogen atom. With such a configuration, the cis→trans reaction rate in the compound is reduced, and the cis isomer is stabilized to generate a larger number of cis isomers. This may further facilitate induction of fluidization. In this case, it is more preferred to satisfy the requirement that, at both the two ortho positions, be unsubstituted or substituted with an alkyl group having 1 to 5 carbon atoms, an alkoxy group having 1 to 5 carbon atoms, or a halogen atom, because the above effect can be more remarkably obtained.

Examples of the alkyl group having 1 to 5 carbon atoms include a methyl group, an ethyl group, a n-propyl group, a n-butyl group, an isobutyl group, a n-pentyl group, an isopropyl group, a sec-butyl group, a t-butyl group, and the like. Examples of the alkoxy group having 1 to 5 carbon atoms include a methoxy group, an ethoxy group, a n-propoxy group, a n-butoxy group, a n-pentyloxy group, and the like. Examples of the halogen atom include a fluorine atom, a chlorine atom, a bromine atom, an iodine atom, and the like.

<Method for Producing Photoresponsive Compound>

A method for synthesizing a compound represented by the general formula (1) (azomethine compound) in the present invention is not particularly limited. For example, in the general formula (1), a compound in which $R_1$ is a 2,5-dimethyl-4-hexyloxyphenyl group and $R_2$ is a triazolyl group can be synthesized by the following scheme.

When 4-hexyloxy-2,5-dimethylbenzaldehyde and a 4-amino-1,2,4-triazole are reacted with each other by heating and stirring in ethanol (EtOH), the reaction liquid is filtered, and the resulting powder is washed with cooled ethanol, and recrystallized with methanol/ethanol, the target azomethine compound can be obtained.

[Chemical Formula 3]

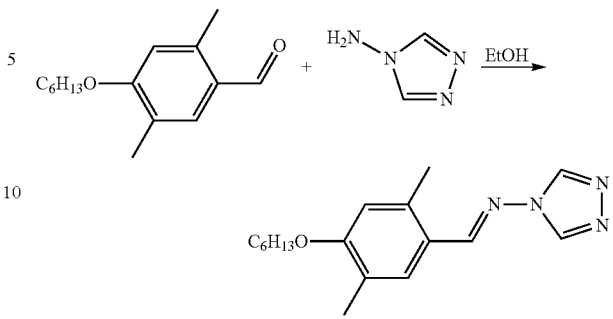

Azomethine compounds other than that described above can also be synthesized by the same method by referring to the above-described scheme and appropriately changing the raw materials.

The azomethine compound of the present invention may be used singly or in combination of two or more kinds thereof.

The molecular weight of the compound represented by the above general formula (1) in the present invention is not particularly limited, and when the compound is not a polymer, the molecular weight thereof is preferably 100 or more and less than 1000, more preferably 100 or more and 800 or less. In the present specification, the compound that is not a polymer refers to a compound that is configured not to contain a repeating unit. In a preferred embodiment, the compound that is not a polymer is not a compound that is obtainable by polymerizing a monomer containing a polymerizable group.

<Photoresponsive Polymer>

An embodiment of the present invention is a polymer which contains a structural unit represented by the following general formula (1') and is fluidized by light irradiation:

[Chemical Formula 4]

$R_1$—CH=N—$R_2$  General Formula (1')

In the formula, $R_1$ is a substituted or unsubstituted cyclic hydrocarbon group or a substituted or unsubstituted heterocyclic group;

$R_2$ is a substituted or unsubstituted heterocyclic group containing a nitrogen atom bonded to the nitrogen atom in the general formula (1'); and at least one of $R_1$ and $R_2$ is bonded to a group containing a structure derived from a polymerizable group.

When the compound is a polymer containing a structural unit represented by the general formula (1'), it is possible to obtain a polymer which is fluidized by light irradiation and is less colored. Further, when the compound is a polymer, toughness as a material can be improved.

In an embodiment of the present invention, the polymer has a group containing a polymerizable group-derived structure in at least one of $R_1$ and $R_2$ in the structural unit represented by the general formula (1'). That is, the polymer has at least one portion bonded to a group containing a polymerizable group-derived structure. Examples of the polymerizable group-derived structure include (meth) acrylic acid ester-derived structures, olefin-derived structures and vinyl ester-derived structures. In an embodiment of the present invention, the photoresponsive polymer includes a (meth)acrylic acid ester-derived structure. Such an embodiment has a technical effect of making polymerization easy.

Specific forms of $R_1$ and $R_2$ in the general formula (1') are the same as those of $R_1$ and $R_2$ in the above general formula (1) except that at least one of $R_1$ and $R_2$ has a group containing a polymerizable group-derived structure.

In an embodiment of the present invention, the polymer contains a structural unit represented by the following general formula (2):

[Chemical Formula 5]

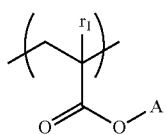

General Formula (2)

In the formula,
$r_1$ is a hydrogen atom or a methyl group; and
A is represented by one of the following general formulae (1-1) to (1-4):

[Chemical Formula 6]

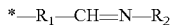 General Formula (1-1)

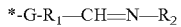 General Formula (1-2)

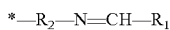 General Formula (1-3)

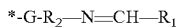 General Formula (1-4)

In the formulae, * represents a bonding point, G is a divalent group, and $R_1$ and $R_2$ are the same as those defined in the general formula (1') (except for moieties corresponding to the polymerizable group-derived structure).

G is not particularly limited as long as it is a divalent group, and is preferably an alkylene group having 1 to 18 carbon atoms or an oxyalkylene group having 1 to 18 carbon atoms. According to such an embodiment, the polymer of the present invention has high thermal mobility and an excellent photo-meltability. In an embodiment of the present invention, G is an alkylene group having 2 to 16 carbon atoms, an alkylene group having 3 to 14 carbon atoms, or an alkylene group having 4 to 12 carbon atoms. In an embodiment of the present invention, the oxyalkylene group is represented by -(E-O)$_n$—, wherein E is an alkylene group having 1 to 18 carbon atoms (for example, 2 to 16 carbon atoms, 3 to 14 carbon atoms or 4 to 12 carbon atoms), and n is 1 to 3, preferably 1. Preferably, the oxygen atom side is a bonding point in the general formulae (1-2) and (1-4).

As an example of the alkylene group having 1 to 18 carbon atoms, a group obtained by removing one hydrogen atom from the group described as an example of the alkyl group having 1 to 18 carbon atoms is suitable.

In a preferred embodiment of the present invention, the A has a structure represented by the general formula (1-1) or the general formula (1-2). It is preferred that a polymerizable moiety be present on the cyclic hydrocarbon group side because fluidization by light irradiation tends to easily occur.
<Method for Producing Photoresponsive Polymer>

The method for producing the photoresponsive polymer of the present invention is not particularly limited, and for example, the photoresponsive polymer of the present invention can be obtained by preparing an azomethine derivative monomer having a polymerizable group and having a predetermined structure, and polymerizing the azomethine derivative monomer by a heretofore known method.

(Structural Unit Derived from Azomethine Derivative Having Polymerizable Group)

Preparation of the azomethine derivative having a polymerizable group can be performed by providing a compound represented by the general formula (1) (azomethine derivative), and introducing a polymerizable group into the azomethine derivative thus obtained.

The method for synthesizing the azomethine derivative represented by the general formula (1) is as described above. For example, as a first stage, as described in the following scheme, when 4-hydroxy-2,5-dimethylbenzaldehyde and 4-amino-1,2,4-triazole are treated (heated under reflux and reacted) in a solvent such as methanol or ethanol, the reaction liquid is filtered, and the resulting powder is washed with cooled ethanol, and recrystallized with methanol/ethanol, an intermediate A as a target product can be obtained.

[Chemical Formula 7]

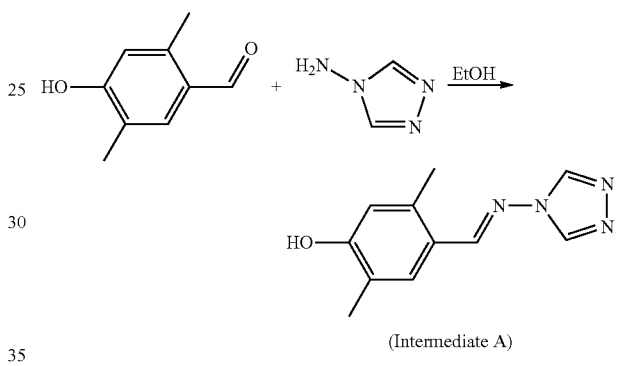

(Intermediate A)

Thereafter, as a second stage, a polymerizable group is introduced into the intermediate A. The method for introducing a polymerizable group is also not particularly limited. For example, when first, —O—$C_{10}H_{22}$— as a linker is introduced into the intermediate A, for example, Cl—$C_{10}H_{20}$—OH is applied as a halogenated alcohol compound to give an intermediate B shown below.

The reaction conditions are not particularly limited, and for example, it is preferred that the reaction is carried out in a solvent such as dimethylformamide (DMF) in the presence of potassium carbonate and potassium iodide, at a temperature preferably in the range of 10° C. or more and 150° C. or less, more preferably in the range of 50° C. or more and 140° C. or less, and still more preferably in the range of 80° C. or more and 130° C. or less. As the order of addition of potassium carbonate and potassium iodide, it is preferred to add potassium carbonate first, and it is preferred that stirring is performed at 0° C. or more and 100° C. or less, more preferably 0° C. or more and 60° C. or less, still more preferably 0° C. or more and 40° C. or less before addition of potassium iodide.

[Chemical Formula 8]

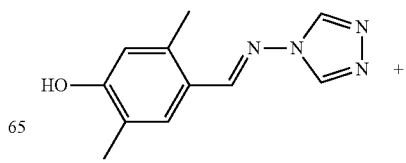

-continued

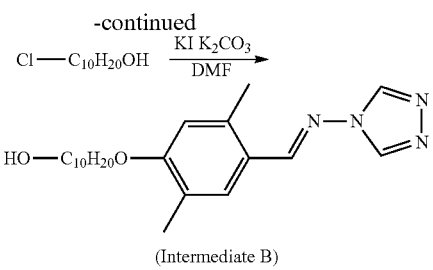

(Intermediate B)

Thereafter, as a third stage, a compound for forming a polymerizable group, for example, an acrylic acid halide (halogenated acryloyl) or a methacrylic acid halide (halogenated methacryloyl) is reacted with the intermediate B. Consequently, the photoresponsive polymer contains a (meth)acrylic acid ester-derived structure. Here, reaction conditions are not particularly limited. It is preferred to carry out the reaction, for example, in a known organic solvent in the presence of a tertiary amine such as triethylamine or triethanolamine. Preferably, the compound for forming a polymerizable group, such as an acrylic acid halide or a methacrylic acid halide, is added dropwise to a mixed liquid containing the intermediate B, the tertiary amine, and a solvent with the mixed liquid being maintained at 0 to 10° C., and the mixture is mixed. Then, the mixed liquid is reacted, for example, at room temperature for about 5 to 10 hours, whereby an azomethine derivative having a polymerizable group is obtained.

[Chemical Formula 9]

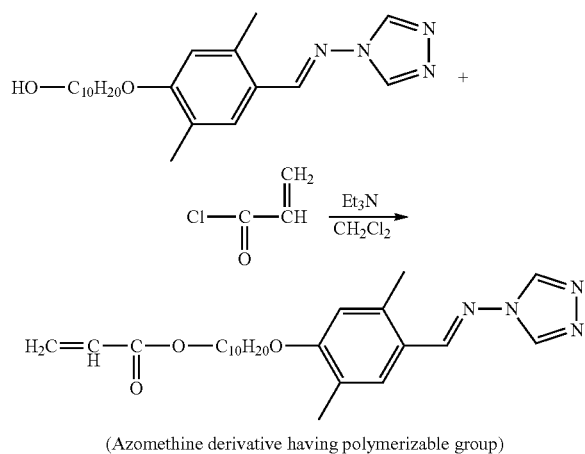

(Azomethine derivative having polymerizable group)

The raw materials used in the first stage may be changed to other compounds to give a desired azomethine derivative.

In addition, a group having a polymerizable group having a different structure can be introduced by changing the compound added in the second stage and the third stage. A person skilled in the art can synthesize an azomethine derivative having a desired polymerizable group by appropriately making the above-mentioned changes and selecting appropriate reaction conditions.

In addition, a polymerizable group can be introduced into the intermediate A without carrying out the second stage by appropriately selecting the raw materials used in the first stage.

(Other Structural Units)

In an embodiment of the present invention, the photoresponsive polymer may contain a structural unit (other structural unit) other than the structural unit represented by the general formula (1'). In the case where the polymer is a copolymer containing the other structural unit, the form of arrangement of repeating units in the copolymer is also not particularly limited, and the copolymer may be any of a random copolymer, a block copolymer, and an alternating copolymer.

The other structural unit is preferably one that does not include the structural unit represented by the general formula (1'), more preferably a structural unit constituting a thermoplastic resin which is softened by heating.

The other structural unit is preferably one having a vinyl-based polymerizable group for the ease of synthesis of the copolymer. That is, in an embodiment of the present invention, the photoresponsive polymer further contains other structural unit derived from a monomer having a vinyl-based polymerizable group. Specifically, for example, a styrene derivative, a (meth)acrylic acid derivative, an olefin derivative, a vinyl ester derivative, a vinyl ether derivative, a vinyl ketone derivative, or the like can be used, and a structural unit derived from a styrene derivative, a (meth)acrylic acid derivative, or an olefin derivative is preferred.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

Examples of the olefin derivative include ethylene, propylene, n-butylene, isobutylene, n-pentene, 3-methyl-1-pentene, and the like. The olefin derivative may be linear or branched, and the number of carbon chains is not particularly limited.

Examples of the vinyl ester derivative include vinyl propionate, vinyl acetate, vinyl benzoate, and the like. Examples of the vinyl ether derivative include vinyl methyl ether, vinyl ethyl ether, and the like. Examples of the vinyl ketone derivative include vinyl methyl ketone, vinyl ethyl ketone, vinyl hexyl ketone, and the like.

The content of the other structural unit in the polymer is not particularly limited, and may be appropriately selected, but is preferably 70 mass % or less, and more preferably 40 mass % or less based on 100 mass % in total of all the structural units forming the polymer. In an embodiment of the present invention, the content of the other structural unit in the polymer may be 5 mass % or more, or 15 mass % or more.

In an embodiment of the present invention, the number average molecular weight Mn of the polymer is not particularly limited, and is, for example, 1000 or more, preferably 3000 or more, 3500 or more, 4000 or more, 5000 or more, or 10000 or more. In an embodiment of the present invention, the number average molecular weight Mn of the polymer is not particularly limited, and is, for example, 100000 or less, preferably 70000 or less, 50000 or less, 40000 or less, or 30000 or less. A number average molecular weight of the polymer of 3000 or more is preferred because the polymer has excellent toughness, and a toner containing the polymer provides a toner image having excellent fixability more easily. In addition, a number average molecular weight of 100000 or less is preferred because the polymer is efficiently isomerized as well as softened and melted.

The number average molecular weight of the polymer of the present invention can be measured by gel permeation chromatography (GPC). Specifically, the number average molecular weight can be measured by the method described in the Examples described later.

(Method for Preparing Polymer)

The method for synthesizing the polymer of the present invention is not particularly limited, and it is possible to use a method in which a compound having a polymerizable group and represented by the general formula (1) is polymerized as a monomer using a known polymerization initiator by anionic polymerization, cationic polymerization, living radical polymerization or the like. A known chain transfer agent may be used if necessary.

Examples of the polymerization initiator include azo or diazo polymerization initiators and peroxide polymerization initiators described below.

Examples of the azo or diazo polymerization initiator include azobisisobutyronitriles (AIBNs) such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and the like.

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris-(t-butylperoxy)triazine, and the like.

Examples of the chain transfer agent include benzyl dithiobenzoate, 1-phenylethyl dithiobenzoate, 2-phenylprop-2-yl dithiobenzoate, 1-acetoxylethyl dithiobenzoate, hexakis(thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio)prop-2-yl)benzene, 1-(4-methoxyphenyl)ethyl dithiobenzoate, and benzyl dithioacetate; and ethoxycarbonylmethyl dithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)prop-2-yl dithiobenzoate, 3- and 4-vinylbenzyl dithiobenzoate, S-benzyldiethoxyphosphinyl dithioformate, t-butyltrithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate, and the like.

The polymerization temperature varies depending on the type of the monomers and polymerization initiator used, and is preferably 50° C. to 100° C., more preferably 55° C. to 90° C. The polymerization time varies depending on the type of the monomers and polymerization initiator used, but is preferably 2 hours or more and 60 hours or less, for example.

The method for preparing the copolymer containing a structural unit other than the structural unit represented by the general formula (1') (other structural unit) is also not particularly limited.

For example, in the case of preparing a random copolymer, a desired copolymer can be obtained by mixing, as raw material monomers, a monomer for forming the structural unit represented by the general formula (1') and a monomer for forming the other structural unit with a chain transfer agent, a polymerization initiator, and the like, and performing a polymerization reaction. The specific form of the monomer for forming the other structural unit is as described above.

In an embodiment of the present invention, the polymer is represented by the following general formula (3):

[Chemical Formula 10]

General Formula (3)

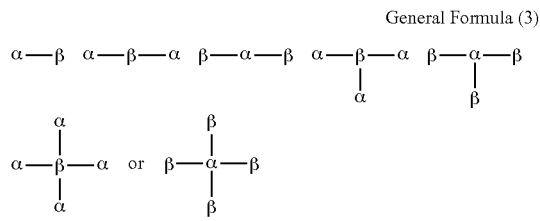

In the formula,
α is each independently a polymer block containing a structural unit represented by the general formula (2); and
β is each independently a polymer block containing a structural unit other than the structural unit represented by the general formula (2). According to such an embodiment, the azomethine derivative easily forms a domain in the polymer, softening and melting can be efficiently induced, and it is possible to obtain a polymer having high toughness by containing a structural unit other than the structural unit represented by the general formula (2).

In the polymer of the present invention, by making a high-molecular weight compound, the moiety of the azomethine structure absorbs light, so that thermal energy released in a process of photoexcitation and deactivation can be transmitted to bonded repeating units (structural units) (photothermal conversion) to progress melting or softening. In addition, it is considered that formation of a block copolymer facilitates formation of a domain by the moiety of the azomethine structure in the polymer, and efficiently induces softening and melting. Therefore, the effects of the present invention can be more remarkably obtained.

The specific form of the structural unit represented by the general formula (2) forming the polymer block α is as described above.

The structural unit constituting the polymer block does not include an azomethine structure ($R_1$—CH=N—$R_2$) in the general formula (1'). Specifically, a form described above as the other structural unit can be preferably used. In particular, from the viewpoint of application to synthesis of a block copolymer by a living radical polymerization method such as an ATRP method, an ARGET-ATRP method, or a RAFT method, the structural unit is preferably one having a vinyl-based polymerizable group. Specifically, for example, a styrene derivative, a (meth)acrylic acid derivative, an olefin derivative, a vinyl ester derivative, a vinyl ether derivative, a vinyl ketone derivative, or the like can be used, and a styrene derivative, a (meth)acrylic acid derivative, or an olefin derivative is preferred.

The number average molecular weight (number average molecular weight of the sum) of the polymer blocks α contained in the polymer represented by the general formula (3) is not particularly limited, and is preferably 1000 or more, more preferably 1000 to 100000, still more preferably 1000 to 70000, even more preferably 1000 to 50000, particularly preferably 3000 to 50000. The number average molecular weight of the sum of the polymer blocks α of 1000 or more is preferred because a toner containing the polymer provides a toner image having excellent fixability more easily. In addition, the number average molecular weight of the sum of the polymer blocks α of 100000 or less is preferred because the polymer is efficiently softened and melted. Here, the number average molecular weight of the sum of the polymer blocks a means, when the polymer represented by the general formula (3) contains a single polymer block α, the number average molecular weight of the polymer block α, and when the polymer represented by the general formula (3) contains a plurality of polymer blocks α, the sum of the number average molecular weights of the polymer blocks α.

The number average molecular weight (number average molecular weight of the sum) of the polymer blocks β contained in the polymer represented by the general formula (3) is not particularly limited, and is preferably 1000 or more, more preferably 1100 to 100000, still more preferably 1500 to 70000, still more preferably 2000 to 50000, particularly preferably 3000 to 40000. The number average molecular weight of the sum of the polymer blocks β of 1,000 or more is preferred because a toner containing the polymer provides a toner image having excellent fixability more easily. In addition, the number average molecular weight of the sum of the polymer blocks β of 100,000 or less is preferred because the polymer is efficiently softened and melted. Here, the number average molecular weight of the sum of the polymer blocks means, when the polymer represented by the general formula (3) contains a single polymer block β, the number average molecular weight of the polymer block β, and when the polymer represented by the general formula (3) contains a plurality of polymer blocks β, the sum of the number average molecular weights of the polymer blocks β.

The total number average molecular weight Mn of the polymer represented by the general formula (3) is preferably 3000 or more, more preferably 3200 to 100000, still more preferably 3300 to 70000, still more preferably 3400 to 50000, particularly preferably 3450 to 50000. The total number average molecular weight of the polymer represented by the general formula (3) of 3000 or more is preferred because a toner containing the polymer provides a toner image having excellent fixability more easily. In addition, the total number average molecular weight of 100,000 or less is preferred because the polymer is efficiently softened and melted.

That is, in the photoresponsive polymer, the number average molecular weight of α is 1000 or more, the number average molecular weight of β is 1000 or more, and the total number average molecular weight is 3000 or more, in an embodiment of the present invention.

In the polymer represented by the general formula (3), the ratio of the number average molecular weight of the sum of the polymer blocks α and the number average molecular weight of the sum of the polymer blocks β is not particularly limited, and from the viewpoint of ease of softening and melting and image intensity, the ratio of the number average molecular weight of the sum of the polymer blocks α: the number average molecular weight of the sum of the polymer blocks β is preferably 1:20 to 20:1, and more preferably 1:15 to 15:1.

The total number average molecular weight, the number average molecular weight of the sum of the polymer blocks α and the number average molecular weight of the sum of the polymer blocks β of the polymer represented by the general formula (3) can be measured by gel permeation chromatography (GPC). Specifically, the number average molecular weight can be measured by the method described in the Examples described later.

The method for synthesizing the block copolymer represented by the general formula (3) is not particularly limited, and known methods such as anionic polymerization, cationic polymerization, and living radical polymerization can be used. Among them, a living radical polymerization method such as an atom transfer radical polymerization method (ATRP method), an ARGET-ATRP method, or a RAFT method can be suitably used as a simple synthesis method.

Taking the ATRP method as an example, the polymer can be synthesized by a method in which a monomer for forming the structural unit of the polymer block α or β is polymerized in the presence of a catalyst using a monofunctional, bifunctional, trifunctional, or tetrafunctional compound containing a halogen element as an initiator and as a starting material.

In the stage of polymerizing the monomer, for example, a monomer for forming the structural unit of either of the polymer blocks α and β (block serving as a core portion of the block copolymer) is polymerized in the presence of an initiator, a catalyst, and a ligand to produce a macroinitiator.

Examples of the initiator include butyl 2-bromoisobutyrate, ethyl 2-bromoisobutyrate, ethylene bis(2-bromoisobutyrate), 1,1,1-tris(2-bromoisobutyryloxymethyl)ethane, pentaerythritol tetrakis(2-bromoisobutyrate), α,α'-dibromo-p-xylene, ethyl bromoacetate, 2-bromoisobutyryl bromide, mixtures thereof, and the like, but the initiator is not limited thereto.

Examples of the catalyst include a copper(I) catalyst, an iron(II) catalyst, and the like, and examples thereof include Cu(I)Cl, Cu(I)Br, Fe(II)Cl, Fe(II)Br, mixtures thereof, and the like.

The ligand used may be a known ligand, and one or more selected from the group consisting of 2,2'-bipyridyl, 4,4'-dimethyl-2,2'-bipyridyl, 4,4'-di-tert-butyl-2,2'-bipyridyl, 1,1,4,7,10,10-hexamethyltriethylenetetramine, N,N,N',N",N"-pentamethyldiethylenetriamine, cyclam(1,4,8,11-tetraazacyclotetradecane), 1,4,8,11-tetramethylcyclam(1,4,8,11-tetramethyl-1,4,8,11-tetraazacyclotetradecane), tris [2-(dimethylamino)ethyl]amine, and the like are preferred.

The amounts of the catalyst and the ligand used are not particularly limited, and can be appropriately determined with reference to conventional knowledge.

Then, the macroinitiator obtained by the polymerization is isolated and used as an initiator, and polymerization of a monomer that is not used for the synthesis of the macroinitiator among the monomers for forming the structural unit of the polymer block α or β is carried out, again in the presence of a catalyst and a ligand. Alternatively, in a stage in which the monomer has been almost entirely consumed in the synthesis of the macroinitiator, a monomer that has not been used for the synthesis of the macroinitiator may be added, without isolating the macroinitiator, and polymerization may be continued. Through these operations, an intended block copolymer can be obtained.

Each of the above-mentioned reactions is preferably performed in an inert atmosphere such as an atmosphere of nitrogen or a rare gas such as argon. Each of the above-mentioned reactions can be performed, for example, at a temperature of 25 to 160° C., preferably 35 to 130° C. Each of the above-mentioned reactions may be performed without using a solvent, or may be performed in a solvent such as an organic solvent such as anisole.

In the reaction of polymerizing the monomer for forming the structural unit of either of the polymer blocks α and β to give a macroinitiator and the reaction of reacting the macroinitiator with the monomer for forming the structural unit of the other polymer block to give a block copolymer, conditions such as the type and amount of the catalyst and the ligand used, and the temperature during the reaction may be the same or different.

<Fluidization by Light Irradiation>

The wavelength of irradiation light at the time of fluidizing the compound or the polymer of the present invention by light irradiation is preferably in the range of 280 nm or more and 480 nm or less, more preferably in the range of 300 nm or more and 420 nm or less, and still more preferably in the range of 330 nm or more and 420 nm or less. When the wavelength is within the above-described range, crystals easily collapse (the photo-meltability is improved), and fixability is improved. At the time of fluidizing the compound or the polymer, heat or pressure may be applied to the compound or the polymer in addition to light irradiation to promote fluidization. When the compound or the polymer is irradiated with the irradiation light having the above-mentioned wavelength, it is possible to fluidize the compound or the polymer with less heat or pressure even when heat or pressure is applied.

The above-mentioned wavelength range includes a part of visible light. Therefore, it is desirable that the compound or the polymer of the present invention be not fluidized only by receiving sunlight (natural light) or light from illumination such as a fluorescent lamp, and fluidized under low cost conditions in which the irradiation amount and the irradiation time are reduced as much as possible. From such a viewpoint, as a condition for irradiation with light in fluidization of the compound, the amount of irradiation light is preferably 0.1 to 200 $J/cm^2$, more preferably 0.1 to 100 $J/cm^2$, still more preferably 0.1 to 50 $J/cm^2$.

In fluidization of the compound, the compound may be heated while being irradiated with light. This enables the compound to be fluidized with a smaller irradiation amount. The heating temperature here is, for example, in the range of 20° C. or more and 200° C. or less, preferably in the range of 20° C. or more and 150° C. or less.

The molar absorption coefficient of the compound of the present embodiment at a wavelength of 400 nm is not particularly limited, and is, for example, in the range of 6000 or less, preferably in the range of 4500 or less, more preferably in the range of 2000 or less. Such a configuration is preferred because coloring is further reduced, and the compound can be more suitably applied to industrial products.

(Toner)

An embodiment of the present invention is a toner containing the compound or the polymer of the present invention. Introduction of the compound or the polymer of the present invention into a toner provides a toner that can be fixed by light irradiation, has excellent fixability, and has high color reproducibility. The term "toner" refers to an aggregate of toner base particles or toner particles. The toner particles are preferably obtained by adding an external additive to the toner base particles, but the toner base particles can be used as toner particles as they are. In the present invention, when it is not necessary to particularly distinguish among the toner base particles, the toner particles, and the toner, they are also simply referred to as "toner(s)".

(Binder Resin)

The toner of the present invention may further contain a binder resin in addition to the compound or the polymer of the present invention. As the binder resin, a resin generally used as a binder resin that constitutes a toner can be used without limitation. As the binder resin, for example, a styrene resin, an acrylic resin, a styrene acrylic resin, a polyester resin, a silicone resin, an olefin resin, an amide resin, an epoxy resin, or the like can be used. These binder resins may be used singly or in combination of two or more kinds thereof.

Among them, it is preferred that the binder resin include at least one selected from the group consisting of a styrene resin, an acrylic resin, a styrene acrylic resin, and a polyester resin, and it is more preferred that the binder resin include at least one selected from the group consisting of a styrene acrylic resin and a polyester resin, from the viewpoint that the resin has a low viscosity when melted and has a high sharp meltability. With such an embodiment, the image intensity can be increased.

(Styrene Acrylic Resin)

The styrene acrylic resin referred to herein is a polymer containing at least a structural unit derived from a styrene monomer and a structural unit derived from a (meth)acrylic acid ester monomer. Here, the styrene monomer includes, in addition to styrene represented by the structural formula of $CH_2=CH-C_6H_5$, a monomer having a structure having a known side chain or functional group in the styrene structure.

Examples of the styrene monomer include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

The (meth)acrylic acid ester monomer has, in a side chain, a functional group having an ester bond. Specifically, the (meth)acrylic acid ester monomer includes vinyl based ester compounds such as, in addition to an acrylic acid ester monomer represented by $CH_2=CHCOOR$ (wherein R is an alkyl group), a methacrylic acid ester monomer represented by $CH_2=C(CH_3)COOR$ (wherein R is an alkyl group). The "(meth)acrylic acid" in the (meth)acrylic acid ester monomer means acrylic acid and methacrylic acid.

Examples of the (meth)acrylic acid ester monomer include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, hydroxymethyl (meth)acrylate, hydroxyethyl (meth)acrylate, and the like.

Both the styrene monomer and the (meth)acrylic acid ester monomer may be used singly or in combination of two or more kinds thereof.

The contents of the structural unit derived from a styrene monomer and the structural unit derived from a (meth)acrylic acid ester monomer in the styrene acrylic resin are not particularly limited, and may be appropriately adjusted from the viewpoint of controlling the softening point and the glass transition temperature of the binder resin. Specifically, the content of the structural unit derived from a styrene monomer is preferably 40 to 95 mass %, more preferably 50 to 90 mass % with respect to all the structural units forming the styrene acrylic resin. In addition, the content of the structural unit derived from a (meth)acrylic acid ester monomer is preferably 5 to 60 mass %, more preferably 10 to 50 mass % with respect to all the structural units.

The styrene acrylic resin may further contain a structural unit derived from other monomer other than the styrene monomer and the (meth)acrylic acid ester monomer as necessary. Examples of the other monomer include a vinyl monomer. Hereinafter, examples of the vinyl monomer that can be used in combination in forming the styrene acrylic copolymer referred to herein will be given, but the vinyl monomer that can be used in combination is not limited to those given below.

(1) Olefins

Ethylene, propylene, isobutylene, and the like (2) Vinyl esters

Vinyl propionate, vinyl acetate, vinyl benzoate, and the like (3) Vinyl ethers

Vinyl methyl ether, vinyl ethyl ether, and the like (4) Vinyl ketones

Vinyl methyl ketone, vinyl ethyl ketone, vinyl hexyl ketone, and the like (5) N-vinyl compounds N-vinylcarbazole, N-vinylindole, N-vinylpyrrolidone, and the like (6) Others Vinyl compounds such as vinylnaphthalene and vinylpyridine, acrylic acid or methacrylic acid derivatives such as acrylonitrile, methacrylonitrile, and acrylamide, and the like In addition, it is also possible to produce a resin having a crosslinked structure using a polyfunctional vinyl monomer. Further, it is also possible to use a vinyl monomer having an ionic dissociation group in a side chain. Specific examples of the ionic dissociation group include a carboxyl group, a sulfonic acid group, a phosphoric acid group, and the like. Among them, specific examples of the vinyl monomer having a carboxyl group include acrylic acid, methacrylic acid, maleic acid, itaconic acid, cinnamic acid, fumaric acid, maleic acid monoalkyl ester, itaconic acid monoalkyl ester, and the like.

A method for preparing the styrene acrylic resin is not particularly limited, and examples thereof include a method of polymerizing the monomers using a known oil-soluble or water-soluble polymerization initiator. If necessary, for example, a known chain transfer agent such as n-octyl mercaptan may be used. Examples of the oil-soluble polymerization initiator include azo or diazo polymerization initiators and peroxide polymerization initiators described below.

Examples of the azo or diazo polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and the like.

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris-(t-butylperoxy)triazine, and the like.

When forming styrene acrylic resin particles by an emulsion polymerization method, a water-soluble radical polymerization initiator can be used. Examples of the water-soluble radical polymerization initiator include persulfates such as potassium persulfate and ammonium persulfate, azobisaminodipropane acetate, azobiscyanovaleric acid and salts thereof, hydrogen peroxide, and the like.

The polymerization temperature varies depending on the type of monomer or polymerization initiator used, but is preferably 50 to 120° C., more preferably 60 to 110° C. or less. The polymerization time varies depending on the type of monomer or polymerization initiator used, and is preferably 2 to 12 hours, for example.

(Polyester Resin)

The polyester resin is a polyester resin obtainable by a polycondensation reaction of a divalent or higher carboxylic acid (polyvalent carboxylic acid component) and a dihydric or higher hydric alcohol (polyhydric alcohol component). The polyester resin may be amorphous or crystalline. The specific form of the polyester resin is not particularly limited, and it is possible to appropriately refer to heretofore known findings.

When the toner according to the present invention contains a binder resin, the content of the compound or the polymer of the present embodiment depends on the type of the compound or resin, and is, for example, 5 to 95 parts by mass, preferably 10 to 90 parts by mass, more preferably 20 to 80 parts by mass, and still more preferably 30 to 70 parts by mass with respect to 100 parts by mass of the binder resin from the viewpoint of fixability and color reproducibility. When the content is within the above-mentioned range, the optical phase transition of the compound or the polymer having an azomethine moiety is likely to occur, and the rate at which the toner is softened by light irradiation becomes sufficient. When two or more types of compounds or polymers are used, it is preferred that the total amount thereof be in the above-described range. When two or more types of binder resins are used, it is preferred that the total amount thereof be in the above-described range.

<Colorant>

The toner of the present invention may further contain a colorant. Since the compound of the present invention is less colored, a toner having high color reproducibility of the colorant can be obtained. As for the colorant, generally known dyes and pigments can be used.

Examples of the colorant for obtaining a black toner include carbon black, a magnetic material, iron-titanium composite oxide black, and the like, and examples of the carbon black include channel black, furnace black, acetylene black, thermal black, and lamp black. Examples of the magnetic material include ferrite, magnetite, and the like.

Examples of the colorant for obtaining a yellow toner include dyes such as C.I. Solvent Yellow 19, 44, 77, 79, 81, 82, 93, 98, 103, 104, 112, and 162; and pigments such as C.I. Pigment Yellow 14, 17, 74, 93, 94, 138, 155, 180, and 185.

Examples of the colorant for obtaining a magenta toner include dyes such as C.I. Solvent Red 1, 49, 52, 58, 63, 111, and 122; and pigments such as C.I. Pigment Red 5, 48:1, 53:1, 57:1, 122, 139, 144, 149, 166, 177, 178, and 222.

Examples of the colorant for obtaining a cyan toner include dyes such as C.I. Solvent Blue 25, 36, 60, 70, 93, and 95; and pigments such as C.I. Pigment Blue 1, 7, 15, 15:3, 60, 62, 66, and 76.

The colorant for obtaining the toner of each color may be used singly or in combination of two or more kinds thereof for each color.

The content of the colorant is preferably 0.5 to 20 mass %, more preferably 2 to 10 mass % in the toner particles (toner base particles) before the addition of the external additive.

<Release Agent>

The toner of the present invention may further contain a release agent. The release agent used is not particularly limited, and various known waxes can be used. Examples of the wax include polyolefins such as low molecular weight polypropylene and polyethylene, or oxidized type low molecular weight polypropylene and polyethylene, paraffin wax, synthetic ester wax, and the like. Among them, paraffin wax is preferably used from the viewpoint of improving the storage stability of the toner.

The content of the release agent is preferably 1 to 30 mass %, more preferably 3 to 15 mass %, in the toner base particles.

<Charge Control Agent>

The toner according to the present invention may contain a charge control agent. The charge control agent used is not particularly limited as long as it is a substance capable of imparting positive or negative charge by frictional charging and is colorless, and various known positive charge control agents and negative charge control agents can be used.

The content of the charge control agent is preferably 0.01 to 30 mass %, more preferably 0.1 to 10 mass % in the toner base particles.

The content of the compound or the polymer of the present invention in the toner is not particularly limited, and is, for example, in the range of 5 to 95 mass % with respect to the total amount of the binder resin, the colorant, the release agent and the compound or the polymer of the present invention that forms the toner, from the viewpoint of efficient fluidization and the image intensity.

<Photopolymerizable Compound and Photopolymerization Initiator>

When the toner containing the compound or the polymer of the present invention is melted by light, and then non-fluidized (re-solidified), the toner may be left standing at room temperature (in the range of 25±15° C.) (in a natural environment), and a photopolymerizable compound and a photopolymerization initiator may be introduced into the toner to accelerate curing by photopolymerization. The photopolymerizable compound is a compound that is cured by irradiation with light and does not correspond to any of a photopolymerization initiator as described later and the compound and the polymer of the present invention.

The photopolymerizable compound is not particularly limited, a heretofore known compound can be used, and a compound having a polymerizable group is preferred. Examples of the compound having a polymerizable group include compounds containing a (meth)acryloyl group (acryloyl group ($CH_2$=CHCO—) or methacryloyl group ($CH_2$=$CCH_3$CO—)). Examples of the compound having a (meth)acryloyl group include (meth)acrylate compounds, and the like.

The photopolymerizable compound may be a compound obtained by introducing a polymerizable group into a polymer compound such as a binder resin of a toner. A method for introducing a polymerizable group is not particularly limited, and it is possible to appropriately refer to a heretofore known method. Examples thereof include a method in which a compound for introducing a polymerizable group such as a halogenated acryloyl or a halogenated methacryloyl is reacted with the polymer compound in the presence of a tertiary amine such as triethylamine or triethanolamine in a known organic solvent such as THF. Specifically, a compound for introducing the polymerizable group is added dropwise to a mixed liquid containing the organic solvent, the tertiary amine and the polymer compound, and the mixture is reacted at 20 to 60° C. for about 1 to 10 hours to introduce the polymerizable group into the polymer compound.

In the toner of the present embodiment, it is preferred to use a binder resin into which a polymerizable group is introduced as a photopolymerizable compound.

The photopolymerization initiator is not particularly limited, and it is possible to use one that has been heretofore known. It is preferred that the photopolymerization initiator has an absorption wavelength region at 280 to 480 nm, and it is more preferred that the photopolymerization initiator has an absorption wavelength region at 330 to 430 nm.

Examples of the photopolymerization initiator include intramolecular cleavage-type photopolymerization initiators and hydrogen abstraction-type photopolymerization initiators, and any of them can be suitably used.

Examples of the intramolecular cleavage-type photopolymerization initiator include acetophenone-based compounds such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-hydroxy-1-{4-[4-(2-hydroxy-2-methyl-propionyl)-benzyl]-phenyl}-2-methyl-propan-1-one, 2,2-dimethoxy-1,2-diphenylethan-1-one, 2,2-diethoxy-1,2-diphenylethan-1-one, and 2,2-dimethoxy-2-phenylacetophenone; oxime-based compounds such as 1-[4-(phenylthio)-,2-(O-benzoyloxime)], and 1-[9-ethyl-6-(2-methylbenzoyl)-9H-carbazol-3-yl]-,1-(O-acetyloxime); carbazole-based compounds such as 3,6-bis(2-methyl-2-morpholinopropanonyl)-9-butylcarbazole; benzoin-based compounds such as benzoin, benzoin methyl ether, and benzoin isopropyl ether; aminoalkylphenone-based compounds such as 2-benzyl-2-dimethylamino-1-(4-morpholinophenyl)butan-1-one, 2-(dimethylamino)-2-(4-methylbenzyl)-1-(4-morpholinophenyl)butan-1-one, 2-methyl-1-[4-(methylthio)phenyl]-2-morpholinopropan-1-one, and 2-benzyl-2-dimethylamino-1-(4-morpholinophenyl)-butanone; acylphosphine oxide-based compounds such as bis(2,4,6-trimethylbenzoyl)-phenylphosphine oxide, 2,4,6-trimethylbenzoyldiphenylphosphine oxide, and bis(2,6-dimethoxybenzoyl)-2,4,4-trimethyl-pentylphosphine oxide; and benzyl and methylphenylglyoxy ester.

Examples of the hydrogen abstraction-type photopolymerization initiator include benzophenone-based compounds such as benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone; thioxanthone-based compounds such as 2-isopropylthioxanthone, 2,4-dimethylthioxanthone, 2,4-diethylthioxanthone, and 2,4-dichlorothioxanthone; and aminobenzophenone-based compounds such as 4,4'-bisdimethylaminobenzophenone and 4,4'-bisdiethylaminobenzophenone.

The photopolymerization initiator may be used singly or in combination of two or more kinds thereof. In addition, as the photopolymerization initiator, a commercially available product may be used, or a synthetic product may be used. The amount of the photopolymerization initiator used is not particularly limited, and heretofore known findings can be appropriately adopted.

In this case, the light irradiation may serve as light irradiation for both polymerization reaction of the photopolymerizable compound and softening of the compound or the polymer of the present invention. When the photosensitive wavelength range of the photopolymerization initiator and the absorption wavelength range of the compound or the polymer of the present invention overlap each other, both polymerization reaction of the photopolymerizable compound and softening of the compound or the polymer of the present invention can be performed at the same time by light irradiation from the same light source. Thus, when used for a toner, softening and fixing of the toner can be effectively performed, and the device can be simplified.

Alternatively, when the photosensitive wavelength range of the photopolymerization initiator and the absorption wavelength range of the compound or the polymer of the present invention do not overlap each other, light irradiation may be performed in sequence or in parallel using two light sources: a light source that applies light in a photosensitive wavelength range of the photopolymerization initiator and a light source that applies light in an absorption wavelength range of the compound or the polymer of the present invention. In this way, the light amount, the irradiation order and the time are individually controlled, and for example, when used for the toner, the viscosity of the toner can be more precisely controlled according to the printing conditions, so that the fixability can be effectively improved.

<External Additive>

In order to improve the flowability, chargeability, cleaning property, and the like of the toner, the toner according to the present invention may be formed by adding, to the toner base particles, external additives such as a fluidizing agent and a cleaning aid that are so-called post-treatment agents.

Examples of the external additive include inorganic particles including inorganic oxide particles such as silica particles, alumina particles, and titanium oxide particles, inorganic stearic acid compound particles such as aluminum stearate particles and zinc stearate particles, and inorganic titanic acid compound particles such as strontium titanate particles and zinc titanate particles. These inorganic particles may be hydrophobized as necessary. These may be used singly or in combination of two or more kinds thereof.

Among these, as the external additives, for example, sol-gel silica particles, silica particles whose surface is hydrophobized (hydrophobic silica particles) or titanium oxide particles whose surface is hydrophobized (hydrophobic titanium oxide particles) are preferred, and it is more preferred to use at least two or more kinds of these external additives.

In an embodiment of the present invention, the amount of addition of these external additives is preferably 0.05 to 5 mass %, more preferably 0.1 to 3 mass % with respect to 100 mass % of the toner base particles.

<Average Particle Size of Toner>

The average particle size of the toner (and the average particle size of the toner base particles) in terms of volume-based median diameter (D50) is preferably 4 to 20 μm, more preferably 5 to 15 μm. When the volume-based median diameter (D50) is within the above-mentioned range, the toner has high transfer efficiency, the halftone image quality is improved, and the image quality of thin lines, dots, and the like is improved.

The volume-based median diameter (D50) can be measured and calculated using a measuring apparatus including "Coulter Counter 3" (manufactured by Beckman Coulter, Inc.) and a computer system (manufactured by Beckman Coulter, Inc.) equipped with data processing software "Software V 3.51" connected thereto.

Specifically, 0.02 g of a measurement sample (toner or toner base particles) is added to 20 mL of a surfactant solution (for example, a surfactant solution obtained by diluting a neutral detergent containing a surfactant component 10-fold with pure water for the purpose of dispersing toner particles) to be compatible with the solution, then the resulting mixture is ultrasonically dispersed for 1 minute to prepare a dispersion liquid. This dispersion liquid is injected into a beaker containing "ISOTON II" (manufactured by Beckman Coulter, Inc.) in a sample stand with a pipette until the concentration displayed on the measuring apparatus reaches 8%.

Here, by setting the displayed concentration within the above-described range, a reproducible measurement value can be obtained. Then, in the measuring apparatus, the count number of the measured particles is set to 25000, the aperture diameter is set to 50 μm, the measurement range of 1 to 30 μm is divided into 256 sections and the frequency values are calculated, and the particle size at 50% of volume integrated fraction from the larger side is taken as the volume-based median diameter (D50).

[Method for Producing Toner]

A method for producing the toner of the present invention is not particularly limited. Examples thereof include a method in which toner raw materials are mixed, and melted and kneaded, the kneaded product is cooled, and the cooled product is ground to obtain resin particles. Specifically, first, raw materials including the compound or the polymer of the present invention, and if necessary, a binder resin, a colorant, a release agent and the like are mixed. Examples of the mixer include Henschel Mixer (registered trademark) (manufactured by NIPPON COKE & ENGINEERING COMPANY, LIMITED); Super Mixer (manufactured by KAWATA MFG. CO., LTD.); RIBOCONE (manufactured by OKAWARA MFG. CO., LTD.); NAUTA MIXER (registered trademark), TURBULIZER and CYCLOMIX (registered trademark) (manufactured by Hosokawa Micron Corporation); Spiral Pin Mixer (manufactured by Pacific Machinery & Engineering Co., Ltd); loedige Mixer (manufactured by MATSUBO Corporation), and the like.

The mixed raw materials are then melted and kneaded. Examples of the kneader include TEM Excluder (manufactured by Toshiba Machine Co., Ltd.); TEX Biaxial Kneader (manufactured by The Japan Steel Works, Ltd.); PCM Kneader (manufactured by Ikegai Corp.); Kneadex (manufactured by Mitsui Kozan Kabushiki Kaisha) and the like. After melt kneading, it is preferred to cool the kneaded product by water cooling or the like.

Next, the cooled product obtained as described above is ground to a desired particle size. In the grinding step, which is not particularly limited, first the cooled product can be coarsely ground with a crusher, a hammer mill, a feather mill or the like, and finely ground with a mechanical grinder or the like to obtain resin particles. The obtained resin particles may be classified to resin particles having a desired particle size in a classification step. The classifier used and the operating conditions are not particularly limited.

It is preferred to further perform a heat treatment step on the resin particles obtained as described above. The heat treatment is not particularly limited, and it is possible to appropriately refer to, for example, the method described in JP 2017-293864 A. According to this method, heat treatment is performed with hot air swirling while swirling the resin particles in the same direction, so that the dispersibility of the resin particles can be improved to obtain resin particles, which have a less number of aggregated particles and are uniform in shape, as toner base particles. The heat treatment device used and the operating conditions are not particularly limited, and can be appropriately adjusted.

In addition, it is preferred that the toner containing the compound or the polymer of the present invention, and a binder resin, a colorant, a release agent and the like if necessary be produced by a production method using an emulsion aggregation method by which the particle size and shape can be easily controlled. As the method for producing a toner using an emulsion aggregation method, a known method can be appropriately adopted.

[Developer]

It is conceivable that the toner according to the present invention will be used, for example, as a one-component magnetic toner containing a magnetic material, a two-component developer containing a mixture of the toner and a so-called carrier, or a nonmagnetic toner by itself, and any of them can be suitably used.

As for the magnetic material, for example, magnetite, γ-hematite, various ferrites, or the like can be used.

As for the carrier contained in the two-component developer, it is possible to use magnetic particles made of a conventionally known material such as metals including iron, steel, nickel, cobalt, ferrite, and magnetite, and alloys of these metals with a metal such as aluminum or lead.

The carrier may be a coated carrier obtained by coating the surface of magnetic particles with a coating agent such as a resin, or a resin dispersion type carrier obtained by dispersing a magnetic material powder in a binder resin. The coating resin is not particularly limited, and for example, an olefin resin, an acrylic resin, a styrene resin, a styrene acrylic resin, a silicone resin, a polyester resin, a fluororesin, or the like is used. In addition, the resin for forming the resin dispersion type carrier particles is not particularly limited, and a known resin can be used. For example, an acrylic resin, a styrene acrylic resin, a polyester resin, a fluororesin, a phenol resin, and the like can be used.

The volume average particle size of the carrier is preferably 20 to 100 μm, more preferably 25 to 80 μm. The volume average particle size of the carrier can be typically measured by a laser diffraction type particle size distribution analyzer "HELOS" (manufactured by Sympatec GmbH) equipped with a wet disperser.

The mixed amount of the toner is preferably 2 to 10 mass % with respect to 100 mass % in total of the toner and the carrier.

[Image Forming Method]

The toner of the present invention can be used in various known electrophotographic image forming methods. For example, the toner can be used in a monochrome image forming method or a full-color image forming method. The full-color image forming method can be applied to any image forming method such as a four-cycle image forming method in which four kinds of color developing devices respectively for yellow, magenta, cyan, and black, and one photoreceptor are used, or a tandem image forming method in which an image forming unit is provided for each color, the image forming unit including a color developing device and a photoreceptor for each color.

That is, an image forming method according to an embodiment of the present invention includes the steps of: 1) forming a toner image containing the toner of the present invention on a recording medium; and 2) irradiating the toner image with light to soften the toner image. With such an embodiment, excellent fixability is exhibited, so that higher image quality is obtained.

Step 1)

In this step, a toner image containing the toner of the present invention is formed on a recording medium.

(Recording Medium)

The recording medium is a member for holding a toner image. Examples of the recording medium include plain paper, high quality paper, coated printing paper such as art paper and coated paper, commercially available Japanese paper and postcard paper, resin films for OHP use or for packaging materials, cloth, and the like.

The recording medium may have a sheet shape (sheet-like shape) having a predetermined size, or an elongated shape that is wound in a roll shape after the toner image is fixed to the recording medium.

As described later, the toner image can be formed, for example, by transfer of the toner image on a photoreceptor onto the recording medium.

Step 2)

In this step, the formed toner image is irradiated with light to soften the toner image. As a result, the toner image can be made to adhere onto the recording medium.

The wavelength of the light irradiated is not particularly limited as long as the light can sufficiently soften the toner image by the photothermal conversion caused by the compound in the toner, and is preferably 280 nm or more and 480 nm or less. When the wavelength is within the above-mentioned range, the toner image can be softened more efficiently. From a similar viewpoint, the light irradiation amount is preferably 0.1 to 200 J/cm$^2$, more preferably 0.1 to 100 J/cm$^2$, still more preferably 0.1 to 50 J/cm$^2$.

As described later, the light irradiation can be performed using a light source such as a light emitting diode (LED) or a laser light source. As described later, heating may be further performed together with light irradiation.

After step 2), a step of pressurizing the softened toner image (step 3)) may be further performed if necessary. With such an embodiment, fixability is improved.

Step 3)

In this step, the softened toner image is pressurized.

The pressure at the time of pressurizing the toner image on the recording medium is not particularly limited, but is preferably 0.01 to 5.0 MPa, more preferably 0.05 to 1.0 MPa. When the pressure is 0.01 MPa or more, the toner image can be largely deformed, so that the contact area between the toner image and the recording sheet S is increased, and the image fixability can be further improved easily. In addition, when the pressure is 5.0 MPa or less, shock noise at the time of pressurization can be reduced.

The pressurizing step may be performed before or in parallel to the step of irradiating the toner image with light to soften the toner image (the aforementioned step 2)), but it is preferred to perform the pressurizing step after light irradiation because it is possible to pressurize the toner image softened in advance, and as a result, image fixability is further improved.

In the pressurizing step, the softened toner image may be further heated. That is, the pressurizing step may be performed with heating the toner image. The temperature (e.g. temperature of the pressurizing member) at this time is preferably 15° C. or more, more preferably 20° C. or more, still more preferably more than 20° C., even more preferably 30° C. or more, even more preferably 40° C. or more. With such an embodiment, fixability is remarkably improved. The upper limit is not particularly limited, and is, for example, 200° C. or less, 150° C. or less, or 100° C. or less.

The temperature for heating the toner image (surface temperature of the toner image during heating) is preferably (Tg+20) to (Tg+100° C.), more preferably (Tg+25) to (Tg+80° C.), where Tg is the glass transition temperature of the toner. When the surface temperature of the toner image is (Tg+20° C.) or more, the toner image is easily deformed by pressurization, and when the surface temperature is (Tg+100° C.) or less, hot offset is easily reduced. Note that the hot offset refers to a phenomenon in which, in a fixing step, part of the toner is transferred to a pressurizing member such as a roller and the toner layer is separated.

Further, before step 2), a step of heating the toner image in advance (step 4)) may be further performed as necessary. When step 4) of heating the toner image in advance is performed before step 2) in this way, sensitivity of the compound of the present invention to light can be further enhanced. As a result, sensitivity to light is less likely to be impaired even though the compound is a polymer, so that melting or softening of the toner image by light irradiation is likely to be promoted.

FIG. 1 is a schematic configuration diagram illustrating an image forming apparatus 100 used in an image forming method according to an embodiment of the present invention. The image forming apparatus used in the present invention is not limited to the following embodiment and the illustrated example. FIG. 1 illustrates an example of a monochrome image forming apparatus 100, but the present invention can also be applied to a color image forming apparatus.

The image forming apparatus 100 is an apparatus that forms an image on a recording sheet S as a recording medium. The image forming apparatus 100 includes an image reading device 71 and an automatic document feeder 72, and forms an image on the recording sheet S conveyed by a sheet conveying system 7 through the use of an image forming unit 10, an irradiation unit 40, and a pressure-bonding unit 9.

The recording medium used in the image forming apparatus 100 is the recording sheet S, but the medium to be subjected to image formation may be other than a paper sheet.

A document d placed on a document table of the automatic document feeder 72 is scanned and exposed by an optical system of a scanning exposure device in the image reading device 71, and read by an image sensor CCD. An analog signal obtained by photoelectric conversion at the image sensor CCD is subjected to analog processing, A/D conversion, shading correction, image compression processing, and the like in an image processing unit 20, and then input to an exposure device 3 in the image forming unit 10.

The sheet conveying system 7 includes a plurality of trays 16, a plurality of sheet feeders 11, conveying rollers 12, a conveyor belt 13, and the like. Each of the trays 16 stores recording sheets S of a predetermined size, and the sheet feeder 11 of the determined tray 16 is operated in accordance with an instruction from a control unit 90 to supply the recording sheet S. The conveying rollers 12 convey the recording sheet S fed from the tray 16 by the sheet feeder 11 or the recording sheet S fed from a manual sheet feeder 15 to the image forming unit 10.

The image forming unit 10 has a configuration in which around a photoreceptor 1 and in a rotation direction of the photoreceptor 1, a charger 2, an exposure device 3, a developing unit 4, a transfer unit 5, and a cleaning unit 8 are arranged in this order.

The photoreceptor 1 as an image carrier is an image carrier having a photoconductive layer formed on a surface thereof, and is configured to be rotatable in a direction of an arrow in FIG. 1 by a driving device (not illustrated). A thermo-hygrometer 17 that detects the temperature and humidity in the image forming apparatus 100 is provided in the vicinity of the photoreceptor 1.

The charger 2 uniformly impart charges to the surface of the photoreceptor 1 to uniformly charge the surface of the photoreceptor 1. The exposure device 3 includes a beam emission source such as a laser diode, and irradiates the charged surface of the photoreceptor 1 with beam light to dissipate the charges of the irradiated portion, and forms an electrostatic latent image corresponding to image data on the photoreceptor 1. The developing unit 4 supplies a toner contained therein to the photoreceptor 1 to form a toner image based on the electrostatic latent image on the surface of the photoreceptor 1.

The transfer unit 5 faces the photoreceptor 1 with the recording sheet S interposed therebetween, and transfers the toner image to the recording sheet S. The cleaning unit 8 includes a blade 85. The blade 85 cleans the surface of the photoreceptor 1 to remove the developer remaining on the surface of the photoreceptor 1.

The recording sheet S to which the toner image has been transferred is conveyed to the pressure-bonding unit 9 by the conveyor belt 13. The pressure-bonding unit 9 is optionally installed, and applies only pressure or heat and pressure to the recording sheet S to which the toner image has been transferred by pressurizing members 91 and 92 to perform fixing processing, thereby fixing the image on the recording sheet S. The recording sheet S on which the image is fixed is conveyed to a sheet ejector 14 by the conveying rollers, and is ejected from the sheet ejector 14 to the outside of the apparatus.

In addition, the image forming apparatus 100 includes a sheet reversing unit 24, and it is possible to convey the recording sheet S having been subjected to the heat fixing processing to the sheet reversing unit 24 before the sheet ejector 14 and eject the recording sheet S with the front and back reversed, or to convey the recording sheet S with the front and back reversed to the image forming unit 10 again and form an image on both sides of the recording sheet S.

<Irradiation Unit>

Figure 2:
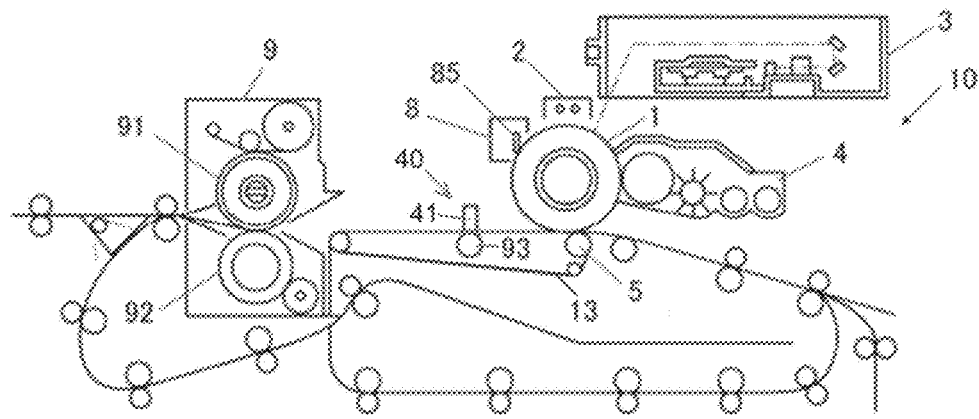
FIG. 2 is a schematic configuration diagram of an irradiation unit 40 in the image forming apparatus 100.

FIG. 2 is a schematic configuration diagram of the irradiation unit 40 in the image forming apparatus 100.

The image forming apparatus 100 according to an embodiment of the present invention includes the irradiation unit 40. The irradiation unit 40 includes a light source 41 and a heating member 93. Examples of a device that constitutes the light source 41 include a light emitting diode (LED), a laser light source, and the like.

The light source 41 irradiates the toner image formed on the recording medium with light to soften the toner image. The conditions for light irradiation are not particularly limited as long as the compound of the present invention contained in the toner of the developer is melted and fluidized. The wavelength of the light irradiated to the toner image may be one allowing the compound to be sufficiently fluidized, and is preferably in the range of 280 nm or more and 480 nm or less, more preferably in the range of 300 nm or more and 420 nm or less, still more preferably in the range of 330 nm or more and 420 nm or less. The light irradiation amount in the light source 41 may be one allowing the compound to be sufficiently fluidized, and is preferably in the range of 0.1 J/cm$^2$ or more and 200 J/cm$^2$ or less, more preferably in the range of 0.1 J/cm$^2$ or more and 100 J/cm$^2$ or less, still more preferably in the range of 0.1 J/cm$^2$ or more and 50 J/cm$^2$ or less.

When the toner image is irradiated with light by the light source 41 to soften the toner image, the toner image may be heated by the heating member 93 while being irradiated with light. This enables softening and melting of the toner image to more efficiently proceed. The heating temperature here is, for example, in the range of 20° C. or more and 200° C. or less, preferably in the range of 20° C. or more and 150° C. or less.

When the softened toner image is left standing at room temperature (range of 25±15° C.), heated or irradiated with visible light, the toner image can be solidified and fixed on the recording medium. Alternatively, when a toner into which a photopolymerizable compound and a photopolymerization initiator have been introduced is used, curing can be accelerated by photopolymerization by applying light in an absorption wavelength region of the photopolymerization initiator. It is preferred that the step of fixing the image further include a step of pressurizing the softened toner image. In the pressurizing step, it is preferred to further heat the softened toner image.

The light source 41 applies light to a first surface of the recording sheet S, which is on the photoreceptor side and holds the toner image, and is disposed on the photoreceptor side with respect to the surface of the recording sheet S nipped between the photoreceptor 1 and the transfer roller 5 which is a transfer unit. The heating member 93 is disposed on a side opposite to the light source 41 with respect to a surface of the recording sheet S. The light source 41 and the heating member 93 are disposed along a conveyance direction of the recording sheet S (sheet conveyance direction).

The light source 41 and the heating member 93 are disposed on the downstream side in the sheet conveyance direction with respect to the nip position between the photoreceptor 1 and the transfer roller 5 and on the upstream side in the sheet conveyance direction with respect to the pressure-bonding unit 9.

According to the image forming method of an embodiment of the present invention, after the photoreceptor 1 is charged by application of a uniform potential from the charger 2, the photoreceptor 1 is scanned with a light flux emitted by the exposure device 3 based on original image data, whereby an electrostatic latent image is formed. Then, a developer that contains the toner of the present invention is supplied by the developing unit 4 onto the photoreceptor 1.

When a recording sheet S is conveyed from any of the trays 16 to the image forming unit 10 in accordance with the timing at which the toner image carried on the surface of the photoreceptor 1 reaches the position of the transfer unit 5 by the rotation of the photoreceptor 1, the toner image on the photoreceptor 1 is transferred to the recording sheet S nipped between the transfer unit 5 and the photoreceptor 1 by the transfer bias applied to the transfer unit 5.

The transfer unit 5 also serves as a pressurizing member, and can reliably bring the compound contained in the toner image into close contact with the recording sheet S while the toner image can be transferred from the photoreceptor 1 to the recording sheet S.

After the toner image is transferred to the recording sheet S, the blade 85 of the cleaning unit 8 removes the developer remaining on the surface of the photoreceptor 1.

In a process in which the recording sheet S to which the toner image has been transferred is conveyed to the pressure-bonding unit 9 by the conveyor belt 13, the light source 41 irradiates the toner image transferred to the recording sheet S with light. Since the toner image on the first surface of the recording sheet S is irradiated with the light by the light source 41, the toner image can be more reliably melted, and the fixability of the toner image to the recording sheet S can be improved.

When the recording sheet S holding the toner image is conveyed by the conveyor belt 13 and reaches the pressure-bonding unit 9, the pressurizing members 91 and 92 pressure-bond the toner image to the first surface of the recording sheet S. Since the toner image has been softened by the light irradiated from the light source 41 before being fixed by the pressure-bonding unit 9, energy for pressure-bonding the image to the recording sheet S can be saved. Further, in the step of solidifying the toner image and fixing the toner image on the recording medium, the toner image is pressurized by the pressurizing members 91 and 92 to further improve the fixability of the toner image on the recording sheet S.

The pressure for pressurizing the toner image is as described above. The pressurizing step may be performed before, in parallel to, or after the step of softening the toner image by light irradiation. It is preferred to perform the pressurizing step after light irradiation because it is possible to pressurize the toner image softened in advance, and image intensity is easily improved.

Further, the pressurizing member 91 can heat the toner image on the recording sheet S when the recording sheet S passes between the pressurizing members 91 and 92. The toner image softened by the light irradiation is further softened by the heating, and as a result, the fixability of the toner image to the recording sheet S is further improved.

The temperature for heating the toner image is as described above. The temperature for heating the toner image (surface temperature of the toner image) can be measured by a non-contact temperature sensor. Specifically, for example, the surface temperature of the toner image on the recording medium may be measured by installing a non-contact temperature sensor at a position where the recording medium is released from the pressurizing members.

The toner image pressure-bonded by the pressurizing members 91 and 92 is solidified and fixed on the recording sheet S.

In an embodiment of the present invention, a fixing device includes a pressure-bonding unit including a pressurizing member. In an embodiment of the present invention, the pressurizing member includes a heating means.

In an embodiment of the present invention, the temperature of the pressurizing member is preferably 15° C. or more, more preferably 20° C. or more, still more preferably more than 20° C., even more preferably 30° C. or more, even more preferably 40° C. or more. The upper limit is not particularly limited, and is, for example, 200° C. or less, 150° C. or less, or 100° C. or less.

<Photoresponsive Release Agent>

Since the compound or the polymer of the present invention is fluidized by light irradiation, a photoresponsive release agent can be produced using the compound or the polymer of the present invention. For example, the compound or the polymer can be applied to various techniques as a photoresponsive release agent that is capable of desorption by light in response to a change in viscosity (friction coefficient) by light irradiation. That is, an embodiment of the present invention is a photoresponsive release agent containing the compound or the polymer of the present invention.

The photoresponsive release agent of the present invention can be used in temporary fixing, and is also suitable for recycling, but the use is not limited thereto.

<Photoresponsive Material>

Since the compound or the polymer of the present invention is fluidized by light irradiation, a photoresponsive material can be produced using the compound or the polymer of the present invention. The photoresponsive material can be produced, for example, by utilizing a change in color or polarity, mass transfer, a change in orientation, a change in viscosity, a change in surface tension, or the like due to photoisomerization. For example, in a liquid crystal material or the like, the photoresponsive material can be applied to pattern drawing in which patterns can be repeatedly redrawn in response to a change in molecular orientation due to photoisomerization. In addition, for example, the surface of a polymer film can be finely processed or patterned by using a change in surface tension due to light irradiation or mass transfer caused by such change. In addition, the photoresponsive material can be applied as a self-repairing material capable of repairing scratches by utilizing a sol-gel change associated with photoisomerization. In addition, the photoresponsive material can be expected to be applied to a light control film or smart glass that controls light transmission by utilizing a change in birefringence which is associated with isomerization. That is, an embodiment of the present invention is a photoresponsive material containing the compound or the polymer of the present invention.

The photoresponsive material according to the present invention is less colored, and thus can be applied to various industrial products. In particular, the photoresponsive material can be suitably used in a liquid crystal display material or surface processing of a polymer film, but the use is not limited thereto.

EXAMPLES

Hereinafter, the present invention will be specifically described with reference to examples, but the present invention is not limited thereto.

Example 1: Synthesis of Compound 1

To a 100-ml four-necked flask equipped with a condenser, a nitrogen introducing tube and a thermometer, 4-hexyloxy-2,5-dimethylbenzaldehyde (7 mmol), 4-amino-1,2,4-triazole (7 mmol), 5 ml of ethanol and 5 ml of acetic acid were charged, and heated and stirred. The reaction liquid was subjected to suction filtration, and the obtained powder was recrystallized with heptane/ethanol to give Compound 1 as a target product with a yield of 86%.

[Chemical Formula 11]

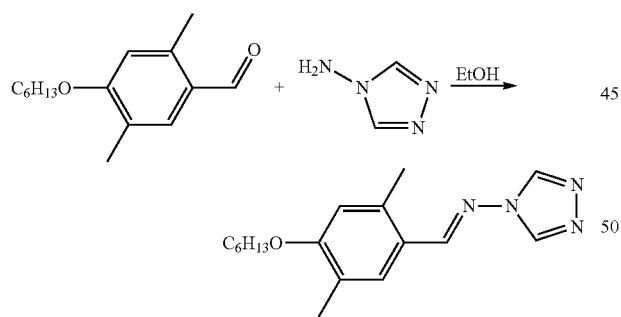

Production of Compound 1 was confirmed by $^1$H NMR. $^1$H-NMR (400 MHz, CDCl$_3$); 9.25 ppm (s, 2H, triazol), 9.12 ppm (s, 1H, CH=N), 7.69 ppm (s, 1H, aryl), 6.90 ppm (s, 1H, aryl), 4.11 ppm (t, 2H, methylene), 2.25 ppm (s, 3H, methyl), 2.18 ppm (s, 3H, methyl), 1.81 ppm (m, 2H, methylene), 1.39 ppm (m, 6H, methylene), 0.90 ppm (t, 3H, methyl).

Examples 2 to 14: Compounds 2 to 14 and Comparative Example 1

For the synthesis of Compounds 2 to 14 and the compound of Comparative Example 1, a target product was obtained by performing synthesis in the same manner as in the synthesis of Compound 1 except that 4-hexyloxy-2,5-dimethylbenzaldehyde and 4-amino-1,2,4-triazole were replaced by the corresponding raw materials described below. In addition, production of each compound was similarly confirmed by $^1$H NMR.

Synthesis of Compound 2: 4-dodecyloxy-2,6-dimethylbenzaldehyde and 4-amino-1,2,4-triazole;
Synthesis of Compound 3: 4-hexyloxy-2,6-dimethylbenzaldehyde and 4-amino-1,2,4-triazole;
Synthesis of Compound 4: 4-octyloxy-2,6-dimethylbenzaldehyde and 4-amino-1,2,4-triazole;
Synthesis of Compound 5: 4-dodecyloxybenzaldehyde and 4-amino-1,2,4-triazole;
Synthesis of Compound 6: 4-octyloxy-2,6-dimethylbenzaldehyde and 1H-pyrrol-1-amine;
Synthesis of Compound 7: 4-octyloxy-2,5-dimethylbenzaldehyde and 1H-pyrazole-1-amine;
Synthesis of Compound 8: 4-hexyloxybenzaldehyde and 1H-imidazole-1-amine;
Synthesis of Compound 9: 4-octyl-2,5-dimethylbenzaldehyde and 1H-1,2,3-triazole-1-amine;
Synthesis of Compound 10: 4-hexyloxybenzaldehyde and 1-amino-1,2,4-triazole;
Synthesis of Compound 11: 4-hexylbenzaldehyde and 2H-tetrazole-2-amine;
Synthesis of Compound 12: 4-pyridinecarboxyaldehyde and 4-amino-1,2,4-triazole;
Synthesis of Compound 13: 5-hexyl-2-thiophenecarboxyaldehyde and 4-amino-1,2,4-triazole;
Synthesis of Compound 14: 4-propylcyclohexanecarboxyaldehyde and 4-amino-1,2,4-triazole; and
Synthesis of Comparative Compound 1 (Comparative 1): 4-hexyloxybenzaldehyde and 1-methyl-1H-pyrrol-3-amine.

Comparative Example 2

Synthesis of Comparative Compound 2 (Comparative 2)

The following Comparative Compound 2 (number average molecular weight Mn: 2870) was obtained by the method described in paragraphs 0217 to 0227 of JP 2014-191078 A.

[Chemical Formula 12]

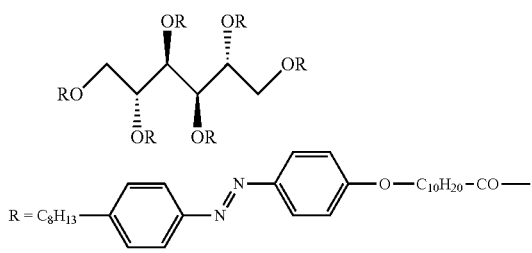

Example 15A: Synthesis of Polymer 15A (Synthesis of Azomethine Derivative Monomer 15)

To a 100-ml four-necked flask, 4-hydroxy-2,5-dimethylbenzaldehyde (0.05 mol), 4-amino-1,2,4-triazole (0.05 mol) and 100 ml of ethanol were charged, and heated and stirred. The reaction liquid was filtered by suction, and the obtained powder was washed with cooled ethanol. Further, the resulting product was recrystallized from methanol/ethanol to give a target product 1.

[Chemical Formula 13]

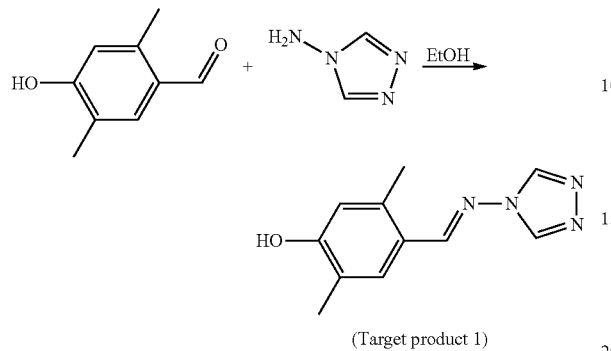

(Target product 1)

Subsequently, in a 200-ml four-necked flask, the target product 1 (0.023 mol) obtained as described above was dissolved in 25 ml of dimethylformamide (DMF). Potassium carbonate (0.035 mol) was added thereto, and the mixture was stirred while being maintained at 30° C. Potassium iodide (0.06 mmol) and 10-chloro-1-decanol (0.026 mol) were added thereto, and the mixture was reacted at 110° C. The mixture was cooled to room temperature and added to 650 g of ice, and then the mixture was filtered. The resulting crystals were dispersed in 400 ml of water, washed by stirring overnight, filtered, and dried. Further, the resulting product was recrystallized from ethanol to give a target product 2.

[Chemical Formula 14]

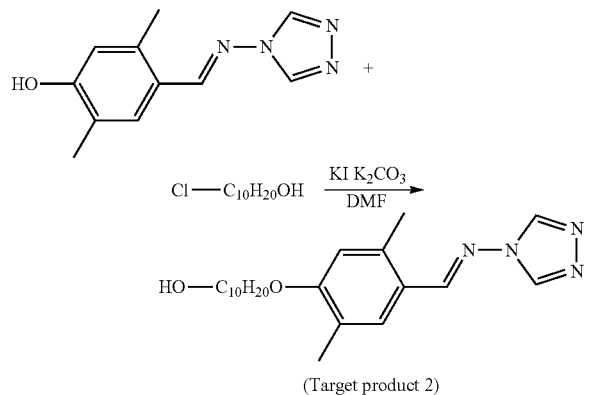

(Target product 2)

Subsequently, to a 100-ml four-necked flask, the target product 2 (0.01 mol) obtained as described above, triethylamine (0.01 mol), and 30 ml of dichloromethane were charged. At that time, the raw materials were in a dispersed state. A solution obtained by dissolving acrylic acid chloride (0.011 mol) in 10 ml of dichloromethane while maintaining the internal temperature at 0° C. was added dropwise while maintaining the internal temperature in the range of 0 to 5° C. As the solution was dropped, the raw materials were dissolved.

After completion of the dropwise addition, the reaction liquid was returned to room temperature and stirred. After completion of the reaction, dichloromethane was removed by concentration, the resulting product was dissolved in ethyl acetate and washed with dilute hydrochloric acid, an aqueous sodium hydrogen carbonate solution, and saturated saline, and the organic layer was dried over magnesium sulfate and then concentrated. The obtained orange crystals were purified with a silica gel column (ethyl acetate/heptane=1/5) to give an azomethine derivative monomer 15.

[Chemical Formula 15]

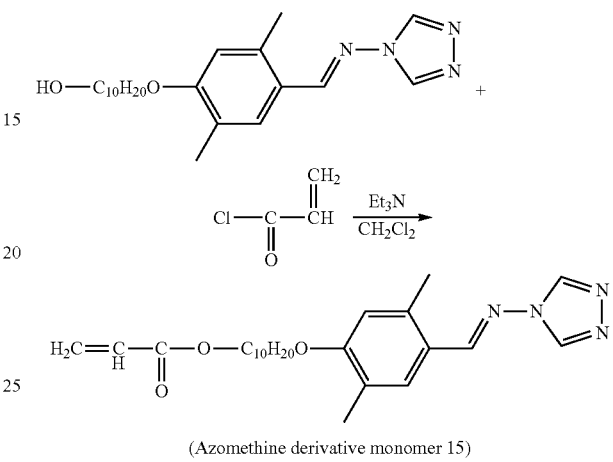

(Azomethine derivative monomer 15)

(Synthesis of Polymer 15A)

In a 100 ml four-necked flask, 4.21 mmol(1.8 g) of azomethine derivative monomer 15 obtained as described above, 0.023 mmol of 4-cyanopentanoic acid dithiobenzoate and 0.006 mmol of AIBN were dissolved in 4 ml of anisole.

Then, an argon gas atmosphere was created by freeze degassing, and then the solution was heated to 75° C. and polymerized by stirring for 8 hours. To the resulting polymer solution, 40 ml of methanol was gradually added dropwise, and THF was then added thereto to remove the unreacted azomethine derivative monomer 15. The separated polymer solution was dried in a vacuum drying oven at 40° C. for 24 hours to give Polymer 15A. The number average molecular weight Mn of the obtained Polymer 15A was measured by a GPC method, and the result showed that the Mn was 16000.

Measurement of a molecular weight distribution by GPC was performed as follows. Using an apparatus "HLC-8220" (manufactured by Tosoh Corporation) and a column "TSK guard column+TSKgel Super HZM-M3 series" (manufactured by Tosoh Corporation), tetrahydrofuran (THF) as a carrier solvent was allowed to flow at a flow rate of 0.2 mL/min with the column temperature maintained at 40° C., and a measurement sample was dissolved in tetrahydrofuran to a concentration of 1 mg/mL under a dissolving condition such that treatment was performed for 5 minutes at room temperature (25° C.) using an ultrasonic disperser. Subsequently, the solution was treated with a membrane filter with a pore size of 0.2 μm to obtain a sample solution, 10 μL of the sample solution was injected into the apparatus together with the carrier solvent, detection was performed using a refractive index detector (RI detector), and a molecular weight distribution of the measurement sample was calculated using a calibration curve obtained by measurement using monodisperse polystyrene standard particles. As a standard polystyrene sample for calibration curve measurement, those manufactured by Pressure Chemical Company and having a molecular weight of $6 \times 10^2$, $2.1 \times 10^3$, $4 \times 10^3$, $1.75\times10^4$, $5.1\times10^4$, $1.1\times10^5$, $3.9\times10^5$, $8.6\times10^5$, $2\times10^6$ or $4.48\times10^6$ were used. The 10 standard polystyrene samples were measured to prepare the calibration curve. In addition, a refractive index detector was used as the detector. The number average molecular weight Mn was calculated from a chromatogram showing a molecular weight distribution measured by GPC as described above.

Example 15B: Synthesis of Polymer 15B

Except that an amount of the azomethine derivative monomer 15 was 1.2 g and styrene/ethyl acrylate were used in an amount of 0.3 g/0.3 g, the same procedure as in the synthesis of Polymer 15A was carried out to give Polymer 15B. The number average molecular weight Mn of the obtained Polymer 15B was measured by a GPC method, and the result showed that the Mn was 10000.

Example 15C: Synthesis of Polymer 15C

Synthesis of Macroinitiator 15C

In a 100-ml recovery flask, 2,2'-bipyridyl (1.47 mmol) was charged, Cu(I)Br (0.66 mmol), styrene (144 mmol) and ethyl 2-bromoisobutyrate (0.18 mmol) were further added thereto in a glove box in a nitrogen atmosphere, and the recovery flask was sealed. The mixture was heated and stirred in an oil bath at 100° C. Thereafter, an appropriate amount of tetrahydrofuran was added, and the mixture was passed through a neutral alumina column. The mixture was purified by reprecipitation and centrifugation with methanol to give a macroinitiator 15C. The number average molecular weight ($\beta$Mn) of the obtained macroinitiator 15C was measured by a GPC method. The result showed that the $\beta$Mn was 6000.

Synthesis of Polymer 15C

In a 100-mL recovery flask, the azomethine derivative monomer 15 (47 mmol) obtained as described above and the macroinitiator 15C (0.18 mmol) were charged, and Cu(I)Cl (0.29 mmol), 1,1,4,7,10,10-hexamethyltriethylenetetramine (0.59 mmol), and anisole (41.1 mmol) as a solvent were further added thereto in a glove box in a nitrogen atmosphere, and the recovery flask was sealed. The mixture was heated and stirred in an oil bath at 80° C. Thereafter, an appropriate amount of chloroform was added, and the mixture was passed through a basic alumina column. The mixture was purified by reprecipitation and centrifugation with methanol to give Polymer 15C. The total number average molecular weight Mn of the obtained Polymer 15C was measured by a GPC method. The result showed that the Mn was 17000. From this, it is determined that the number average molecular weight ($\alpha$Mn) of the azomethine derivative-derived structural unit is 11000.

Examples 16 and 17: Synthesis of Polymers 16 and 17

(Synthesis of Azomethine Derivative Monomer 16)

An azomethine derivative monomer 16 was synthesized in the same manner as in the synthesis of the azomethine derivative monomer 15 except that 4-hydroxy-2,5-dimethylbenzaldehyde was changed to 4-hydroxy-2,6-dimethylbenzaldehyde.

(Synthesis of Azomethine Derivative Monomer 17)

An azomethine derivative monomer 17 was synthesized in the same manner as in the synthesis of the azomethine derivative monomer 15 except that 4-hydroxy-2,5-dimethylbenzaldehyde was changed to 4-hydroxybenzaldehyde, and 10-chloro-1-decanol was changed to 6-chloro-1-hexanol.

(Synthesis of Polymers 16 and 17)

Polymers 16 and 17 were synthesized in the same manner as in the synthesis of Polymer 15A except that the azomethine derivative monomer 15 was changed to azomethine derivative monomers 16 and 17, respectively. The number average molecular weight Mn of each of Polymers 16 and 17 was measured by a GPC method, and the result showed that the Mns were 14000 and 20000, respectively.

Table 1 shows the structures of Compounds 1 to 14, Comparative Compounds 1 and 2, and the structures of repeating units constituting Polymers 15A to 15C, 16 and 17.

[Evaluation: Photoresponsive Peeling Test]

Figure 3:
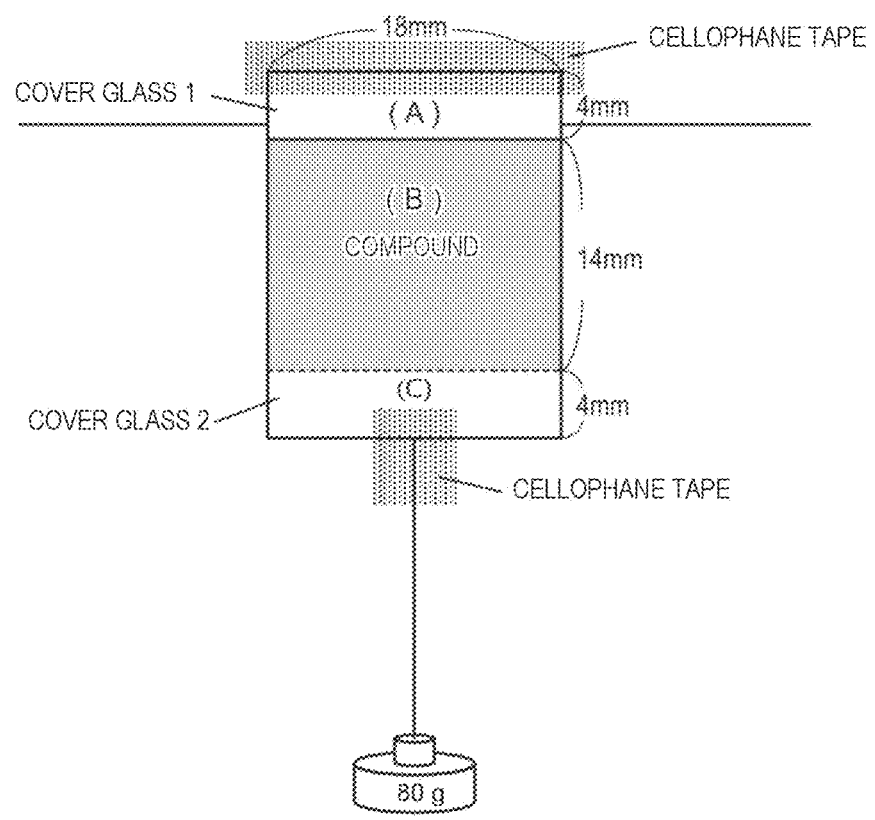
FIG. 3 is a schematic view of a device used in a photoresponsive peeling test in Examples.

Compounds 1 to 14, Comparative Compounds 1 and 2 and Polymers 15A to 15C, 16 and 17 prepared as described above were evaluated for changes in adhesiveness due to light irradiation by the following photoresponsive peeling test using a device shown in FIG. 3. As shown in FIG. 3, 2 mg of a sample was placed on a 18-mm square cover glass 1 within a 6-mm radius from the center of the cover glass 1, and a cover glass 2 of the same size was placed on the cover glass 1 at a position shifted by about 4 mm in a direction parallel to the cover glass 1 so as to cover the entire sample. The resulting product was heated to melt the sample, and the cover glass 1 and the cover glass 2 were adhered to each other.

A portion (A) shown in FIG. 3 was then fixed to a table with a cellophane tape, and a 30-cm long vinyl string having a weight of 80 g attached thereto was fixed to a portion (C) with a cellophane tape. A portion (B) was irradiated with light having a wavelength of 334 nm at an irradiation amount of 20 J/cm$^2$, and whether or not the cover glass 2 was peeled off from the cover glass 1 was observed and determined according to the following evaluation criteria. ⊙ and ○ were regarded as pass. The results are shown in Table 2 below.

⊙: The cover glass 2 was completely peeled off from the cover glass 1.

○: The cover glass 2 was displaced.

x: The cover glass 2 did not move.

[Production of Toner]

<Preparation of Styrene Acrylic Resin>

In an autoclave reaction tank equipped with a thermometer and a stirrer, 300 parts by mass of THF was added and nitrogen substitution was carried out. Thereafter, 80.0 parts by mass of styrene, 10.0 parts by mass of butyl acrylate and 10.0 parts by mass of hydroxyethyl acrylate were added, 7.0 parts by mass of AIBN was then added, and polymerization was performed at 100° C. for 7 hours. Thereafter, the mixture was cooled to room temperature to give a styrene-acryl-based polymer solution. Further, 20.0 parts by mass of triethylamine was added, 11.0 parts by mass of acryloyl chloride was then added dropwise over 5 minutes. Thereafter, the mixture was stirred at 50° C. for 3 hours. The mixed liquid was reprecipitated with ethanol, and filtered to give a styrene acrylic resin. The weight average molecular weight of the obtained styrene acrylic resin was 13000.

<Preparation of Toner 1>

Styrene acrylic resin: 100.0 parts by mass

Compound 1: 30.0 parts by mass

Paraffin wax "HNP-11" (manufactured by NIPPON SEIRO CO., LTD): 6 parts by mass

Copper phthalocyanine (C.I. Pigment Blue 15:3): 8 parts by mass

Omnirad (registered trademark) 651 (manufactured by IGM Resins B.V. Company): 22.0 parts by mass 3,5-di-t-butylsalicylic acid aluminum compound (charge control agent): 0.3 parts by mass The materials described above were mixed at a rotation speed of 20 s$^{-1}$ for a rotation time of 5 min using Henschel Mixer (registered trademark) (model FM-75, manufactured by NIPPON COKE & ENGINEERING COMPANY, LIMITED), and then kneaded by a twin-screw kneader (model PCM-30, manufactured by Ikegai Corp.) set at a temperature of 130° C. The obtained kneaded product was cooled, and coarsely ground to 1 mm or less with a hammer mill to give a coarsely ground product. The obtained coarsely ground product was finely ground with a mechanical grinder (T-250, manufactured by Turbo Kogyo Co., Ltd.). Further, classification was performed using FACULTY F-300 (manufactured by Hosokawa Micron Corporation) to give resin particles 1. For the operating conditions, the classification rotor speed was 130 s$^{-1}$, and the dispersion rotor speed was 120 s$^{-1}$.

The obtained resin particles 1 were subjected to heat treatment using a heat treatment device to give toner particles 1. For the operating conditions, the feed rate was 5 kg/hr, the hot air temperature was 150° C., the hot air flow rate was 6 m$^3$/min, the cold air temperature was −5° C., the cold air flow rate was 4 m$^3$/min, the blower flow rate was 20 m$^3$/min, and the injection air flow rate was 1 m$^3$/min.

100 parts by mass of toner particles 1, 1.0 part by mass of hydrophobic silica surface-treated with hexamethyldisilazane, and 1.0 part by mass of titanium oxide particles surface-treated with isobutyltrimethoxysilane were mixed at a rotation speed of 30 s$^{-1}$ for a rotation time of 10 minutes with Henschel Mixer (model FM-75, manufactured by NIPPON COKE & ENGINEERING COMPANY, LIMITED) to give Toner 1. The average circularity of the obtained toner 1 was 0.968.

The average circularity of the toner was measured using "FPIA-2100" (manufactured by Sysmex Corporation). Specifically, the toner was wetted with an aqueous surfactant solution, dispersed by performing ultrasonic dispersion for 1 minute, and measurement was then performed at an appropriate concentration of 4000 in terms of the number of detections in HPF in a HPF (high power field) mode as a measurement condition using "FPIA-2100". The circularity was calculated from the following equation.

Circularity=(perimeter of circle having projected area equal to that of particle image)/(perimeter of particle projected image)

In addition, the average circularity is an arithmetic average value obtained by summing up the circularities of the particles and dividing the sum by the total number of the measured particles.

Preparation of Toners 2 to 21 and Toners of Comparative Examples 1 and 2

Except that the kinds and the ratios of the compounds/polymers were changed as in Table 3 below, the same procedure as in the preparation of Toner 1 was carried out to give Toners 2 to 21 and toners of Comparative Examples 1 and 2. The "compound/polymer" in Tables 1 to 3 below indicates the compound or polymer of each of examples and comparative examples. In Table 3, the ratio of the compound/polymer is the ratio (mass %) of the compound/polymer with respect to 100 mass % of the binder resin in the toner.

(Production of Developers)

Toners 1 to 21 and the toners of Comparative Examples 1 and 2 produced as described above were mixed with ferrite carrier particles coated with a copolymer resin of cyclohexane methacrylate and methyl methacrylate (mass ratio between monomers 1:1) and having a volume average particle size of 30 am so as to obtain a toner particle concentration of 6 mass %, thereby obtaining Developers 1 to 21 and developers of Comparative Examples 1 and 2, respectively. Mixing was carried out for 30 minutes using a V-type mixer.

[Evaluation: Fixability Test]

The fixability test was conducted in a normal temperature and normal humidity environment (temperature: 20° C., relative humidity: 50% RH) using the developers 1 to 21 and the developers of comparative examples 1 and 2 obtained as described above. A developer was disposed while being slid by a magnetic force between a pair of parallel plate (aluminum) electrodes having a developer on one side and CF paper as a recording medium (basis weight: 80 g/m$^2$) on the other side. A toner was developed under conditions of a gap between electrodes of 0.5 mm and a toner adhesion amount under a DC bias and an AC bias of 6 g/m$^2$, and a toner layer was formed on the surface of the recording medium and fixed by a fixing device to produce a printed matter (image formation).

A 1-cm square toner image of the printed matter was rubbed 10 times with "JK Wiper (registered trademark)" (manufactured by NIPPON PAPER CRECIA CO., LTD.) under a pressure of 50 kPa, and the fixing rate of the image was evaluated. A fixing rate of 60% or more was regarded as pass. The results are shown in Table 3 below. Herein, the image fixing rate is a numerical value obtained by measuring the densities of the image after printing and the image after rubbing with a reflection densitometer "RD-918" (manufactured by SAKATA INX ENG. CO., LTD.), and dividing the reflection density of the solid image after rubbing by the reflection density of the solid image after printing, and is expressed in percentage.

As for the fixing device, the following fixing device formed by appropriately modifying the device illustrated in FIG. 2 was used.

Fixing device 1: In FIG. 2, the pressure-bonding unit 9 is omitted, the temperature of the heating member 93 is 20° C., the wavelength of ultraviolet light irradiated from the light source 41 is 334 nm, and the irradiation amount is 15 J/cm$^2$.

—Evaluation Criteria for Fixability—

⊙: The fixing rate is 85% or more.

○: The fixing rate is 75% or more and less than 85%.

Δ: The fixing rate is 60% or more and less than 75%.

x: The fixing rate is less than 60%.

[Evaluation: Color Reproducibility Evaluation]

For the images of examples and comparative examples as described above, color reproducibility was evaluated on the basis of visual evaluation by 15 panelists in accordance with the following evaluation criteria. Specifically, as a comparative sample for evaluation, a toner obtained by removing the photoresponsive compound or polymer from the toner of each of examples and comparative examples was prepared. Using the toner, a developer was produced in the same manner as described above, development was performed in the same manner as in the image formation in the fixability test, and fixation was performed with the following fixing device No. 2.

Fixing device No. 2: In FIG. 2, the temperature of the heating member 93 is 20° C., the temperature of the pressurizing member 91 is 150° C., the pressure at the time of pressurization is 0.2 MPa, and light irradiation is not performed.

The comparative samples for evaluation and the samples described in examples were shown in sequence to 15 panelists, and the panelists were asked if the colors of the two images were clearly different. The determination results according to the following evaluation criteria for color reproducibility are shown in Table 3 below.

⊙: 2 or less panelists answered that the images had clearly different colors.
○: 3 or 4 panelists answered that the images had clearly different colors.
Δ: 5 to 7 panelists answered that the images had clearly different colors.
×: 8 or more panelists answered that the images had clearly different colors.

TABLE 1

| Compound/polymer No. | Structure |
|---|---|
| 1 | 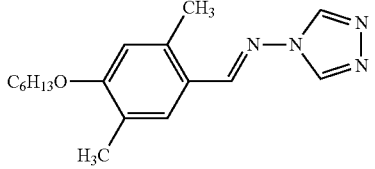 |
| 2 | 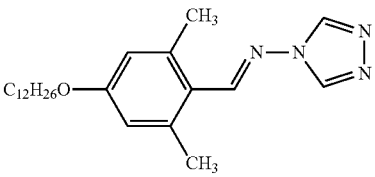 |
| 3 | 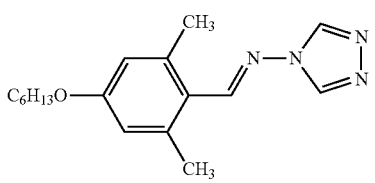 |
| 4 | 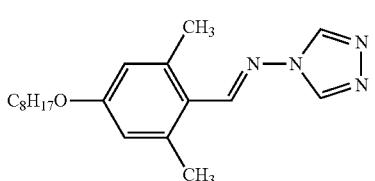 |
| 5 | 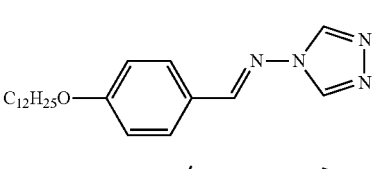 |
| 6 | 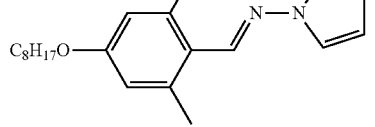 |
| 7 | 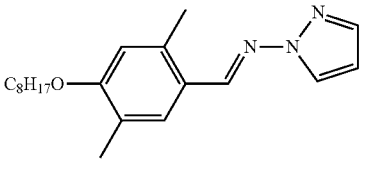 |
| 8 | 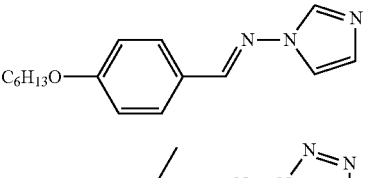 |
| 9 | 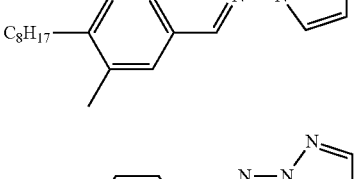 |
| 10 | 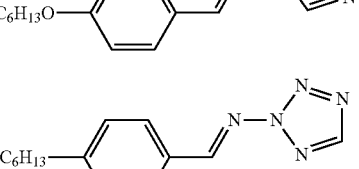 |
| 11 | 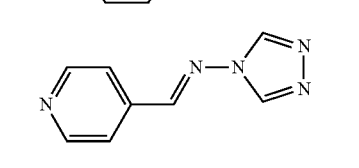 |
| 12 | 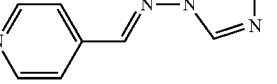 |
| 13 | 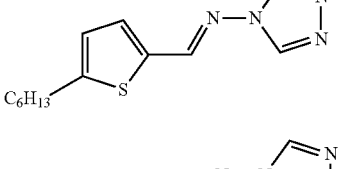 |
| 14 | 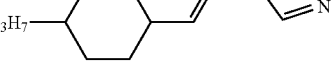 |
| 15 | 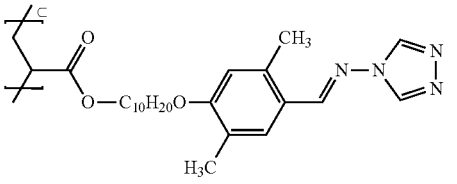 |
| 16 | 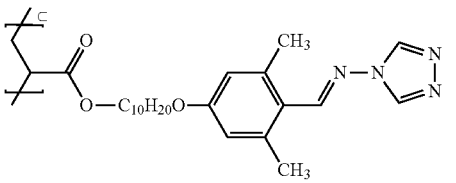 |

TABLE 1-continued

| Compound/polymer No. | Structure |
|---|---|
| 17 | (polymer with acrylate, –O–C$_6$H$_{12}$O–phenyl–CH=N–triazole) |
| Comparative 1 | C$_6$H$_{13}$O–phenyl–CH=N–(1-methylpyrrole) |
| Comparative 2 | Azobenzene derivative |

TABLE 2

| Compound/polymer No. | Photoresponsive release test |
|---|---|
| 1 | ⊚ |
| 2 | ⊚ |
| 3 | ⊚ |
| 4 | ⊚ |
| 5 | ⊚ |
| 6 | ⊚ |
| 7 | ⊚ |
| 8 | ⊚ |
| 9 | ⊚ |
| 10 | ⊚ |
| 11 | ⊚ |
| 12 | ○ |
| 13 | ○ |
| 14 | ○ |
| 15A (Homopolymer) | ⊚ |
| 15B (Random copolymer) | ⊚ |
| 15C (Block copolymer) | ⊚ |
| 16 (Homopolymer) | ⊚ |
| 17 (Homopolymer) | ⊚ |
| Comparative 1 | X |
| Comparative 2 | ⊚ |

TABLE 3

| Example No. | Toner No. | Compound/polymer No. | Ratio (mass %) | Fixability Rank | Fixing rate (%) | Color reproducibility |
|---|---|---|---|---|---|---|
| 1 | 1 | 1 | 30 | ⊙ | 90 | ⊙ |
| 2 | 2 | 2 | 30 | ⊙ | 91 | ⊙ |
| 3 | 3 | 3 | 30 | ⊙ | 89 | ⊙ |
| 4 | 4 | 4 | 30 | ⊙ | 89 | ⊙ |
| 5 | 5 | 5 | 30 | ○ | 84 | ⊙ |
| 6 | 6 | 6 | 30 | ⊙ | 87 | ⊙ |
| 7 | 7 | 7 | 30 | ⊙ | 88 | ⊙ |
| 8 | 8 | 8 | 30 | ○ | 83 | ⊙ |
| 9 | 9 | 9 | 30 | ⊙ | 86 | ⊙ |
| 10 | 10 | 10 | 30 | ○ | 80 | ⊙ |
| 11 | 11 | 11 | 30 | ○ | 77 | ⊙ |
| 12 | 12 | 12 | 30 | Δ | 70 | ⊙ |
| 13 | 13 | 13 | 30 | Δ | 72 | ⊙ |
| 14 | 14 | 14 | 30 | Δ | 62 | ⊙ |
| 15A | 15A | 15A | 70 | ⊙ | 93 | ⊙ |
| 15B | 15B | 15B | 70 | ⊙ | 92 | ⊙ |
| 15C | 15C | 15C | 70 | ⊙ | 95 | ⊙ |
| 16 | 16 | 16 | 70 | ⊙ | 94 | ⊙ |
| 17 | 17 | 17 | 70 | ⊙ | 91 | ⊙ |
| 18 | 18 | 1 | 10 | ⊙ | 85 | ⊙ |
| 19 | 19 | 1 | 50 | ⊙ | 90 | ⊙ |
| 20 | 20 | 1 | 70 | ⊙ | 90 | ⊙ |
| 21 | 21 | 1 | 90 | ⊙ | 88 | ⊙ |
| Comparative Example 1 | Comparative Example 1 | Comparative 1 | 30 | X | 56 | ○ |
| Comparative Example 2 | Comparative Example 2 | Comparative 2 | 30 | ○ | 76 | X |

As is apparent from Table 2 above, it was found that all compounds and polymers of the present invention were fluidized by light irradiation. On the other hand, it was found that the compound of Comparative Example 1 in which a nitrogen atom of a heterocyclic group was not directly bonded to the nitrogen atom of the C=N bond was less likely to be fluidized as compared to the compounds and polymers of each of the examples.

As is apparent from Table 3, all toners of examples exhibited high fixability and excellent color reproducibility. On the other hand, in the toner of Comparative Example 1 using a compound in which a nitrogen atom of a heterocyclic group is not directly bonded to the nitrogen atom of the C=N bond, sufficient fixability by light irradiation cannot be obtained. In addition, it was found that the toner of Comparative Example 2 using an azobenzene compound did not have sufficient fixability and had low color reproducibility.

DESCRIPTION OF REFERENCE NUMERALS

1 Photoreceptor
2 Charger
3 Exposure device
4 Developing unit
5 Transfer unit
7 Sheet conveying system
8 Cleaning unit
9 Pressure-bonding unit
10 Image forming unit
11 Sheet feeder
12 Conveying roller
13 Conveyor belt
14 Sheet ejector
15 Manual sheet feeder
16 Tray
17 Thermo-hygrometer
20 Image processing unit
24 Sheet reversing unit
40 Irradiation unit
41 Light source
71 Image reading device
72 Automatic document feeder
85 Blade
90 Control unit
91, 92 Pressurizing member
93 Heating member
100 Image forming apparatus
d Document
S Recording sheet Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2021-087106, filed on May 24, 2021, is incorporated herein by reference in its entirety.

What is claimed is:

1. A compound represented by the following general formula (1), which is fluidized by light irradiation:

$$R_1-CH=N-R_2 \qquad \text{General Formula (1)}$$

wherein
$R_1$ is a substituted or unsubstituted cyclic hydrocarbon group or a substituted or unsubstituted heterocyclic group,
$R_2$ is a 5-membered heterocyclic group containing a nitrogen atom bonded to the nitrogen atom in the general formula (1), the 5-membered heterocyclic group being unsubstituted or substituted with an alkyl group having 1 to 18 carbon atoms, and
wherein $R_1$ comprises a benzene ring bonded to the carbon atom in the general formula (1), the benzene ring has a substituent at least at a para position with respect to the carbon atom in the general formula (1), and the substituent is selected from the group consisting of an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

2. The compound according to claim 1, wherein $R_1$ is a substituted or unsubstituted aromatic hydrocarbon group or a substituted or unsubstituted aromatic heterocyclic group; and
$R_2$ is a 5-membered aromatic heterocyclic group containing a nitrogen atom bonded to the nitrogen atom in the general formula (1).

3. The compound according to claim 1, wherein $R_1$ comprises the benzene ring which is, at least at one of two ortho positions with respect to the carbon atom in the general formula (1), substituted with an alkyl group having 1 to 5 carbon atoms, an alkoxy group having 1 to 5 carbon atoms, or a halogen atom.

4. The compound according to claim 1, wherein a wavelength of light in the light irradiation is 280 nm or more and 480 nm or less.

5. A polymer comprising a structural unit represented by the following general formula (1') and is fluidized by light irradiation:

$$R_1-CH=N-R_2 \qquad \text{General Formula (1)}$$

wherein
$R_1$ is a substituted or unsubstituted cyclic hydrocarbon group or a substituted or unsubstituted heterocyclic group;
$R_2$ is a 5-membered heterocyclic group containing a nitrogen atom bonded to the nitrogen atom in the general formula (1'), the 5-membered heterocyclic group being unsubstituted or substituted with an alkyl group having 1 to 18 carbon atoms; and
at least one of $R_1$ and $R_2$ is bonded to a group containing a structure derived from a (meth)acryl-based polymerizable group including an alkoxy linkage group.

6. The polymer according to claim 5, wherein a wavelength of light in the light irradiation is 280 nm or more and 480 nm or less.

7. A photoresponsive release agent comprising the compound set forth in claim 1.

8. A photoresponsive release agent comprising the polymer set forth in claim 6.

9. A toner comprising the compound set forth in claim 1.

10. A toner comprising the polymer set forth in claim 5.

11. A photoresponsive material comprising the compound set forth in claim 1.

12. A photoresponsive material comprising the polymer set forth in claim 5.

13. An image forming method comprising:
forming a toner image containing the toner set forth in claim 9 on a recording medium; and irradiating the toner image with light to soften the toner image.

14. An image forming method comprising:

forming a toner image containing the toner set forth in claim 10 on a recording medium; and irradiating the toner image with light to soften the toner image.

\* \* \* \* \*